(12) United States Patent
Lewis et al.

(10) Patent No.: US 6,378,898 B1
(45) Date of Patent: Apr. 30, 2002

(54) INFLATABLE AIR BAG FOR AN INFLATABLE RESTRAINT SYSTEM

(75) Inventors: Donald J. Lewis, Scottsdale; Lowell W. Roemke, Tempe, both of AZ (US)

(73) Assignee: The B.F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/329,015

(22) Filed: Jun. 9, 1999

(51) Int. Cl.[7] .......................... B60R 21/18; B60R 21/28
(52) U.S. Cl. ........................................ 280/733; 280/739
(58) Field of Search .................. 280/733, 743.1, 280/739, 735

(56) References Cited

U.S. PATENT DOCUMENTS

| | | | | |
|---|---|---|---|---|
| 3,430,979 A | * | 3/1969 | Terry et al. | 280/733 |
| 3,884,499 A | * | 5/1975 | Oka et al. | 280/739 |
| 5,062,662 A | * | 11/1991 | Cameron | 280/733 |
| 5,282,648 A | * | 2/1994 | Peterson | 280/733 |
| 5,465,999 A | * | 11/1995 | Tanaka et al. | 280/733 |
| 5,466,003 A | | 11/1995 | Tanaka et al. | 280/733 |
| 5,871,230 A | | 2/1999 | Lewis | 280/733 |
| 5,899,494 A | * | 5/1999 | Lane, Jr. | 280/739 |
| 6,131,949 A | | 10/2000 | Lewis et al. | 280/739 |

FOREIGN PATENT DOCUMENTS

| | | |
|---|---|---|
| DE | 195 22 765 | 1/1997 |
| DE | 298 05 209 | 6/1998 |
| DE | 197 25 558 | 12/1998 |
| DE | 299 21 162 | 4/2000 |

* cited by examiner

Primary Examiner—Peter C. English
(74) Attorney, Agent, or Firm—Jerry J. Holden

(57) ABSTRACT

An inflatable air bag, in its uninflated state, is folded against a seat belt that is secured around the waist of a vehicle occupant and is enclosed by a tubular webbing making the assembly appear as a typical seat belt. Upon a sudden deceleration of a vehicle, the air bag inflates and takes an L-shaped form against an occupant of a vehicle. A rearward protrusion from the upright portion of the L bears against the upper torso portion of the occupant. The rearward protrusion does not bear against the face of either a fifth, fiftieth or ninety-fifth percentile occupant. When inflated the air bag in addition to the rearward protrusion, has a torso section, a waist section and a lap section. The waist section functions to bear against the occupant to push the occupant back into the seat. The torso and lap sections function to push the occupant back and down into the seat. The deployment sequence of the inflation of the sections is determined by the method of folding the air bag against the seat belt. A deflation member operates to release the inflation fluid from the air bag a predetermined time after inflation of the air bag.

76 Claims, 17 Drawing Sheets

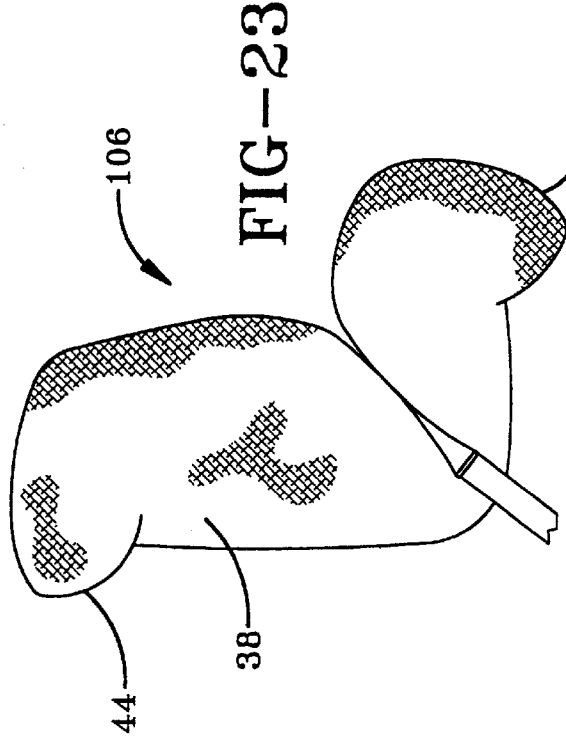
FIG-23
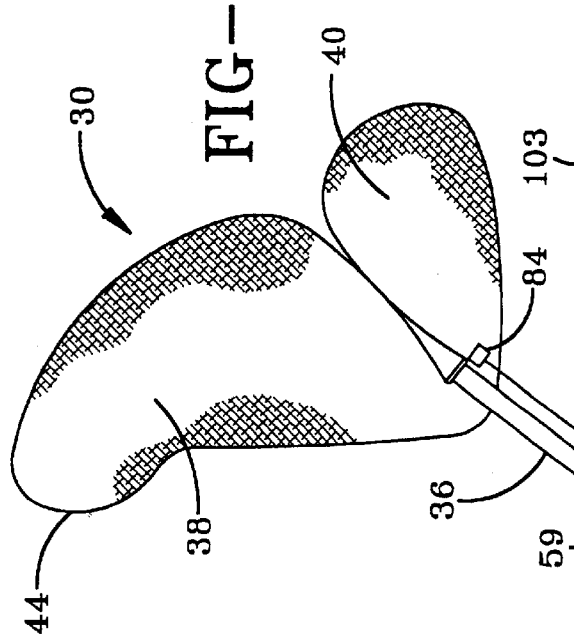
FIG-22
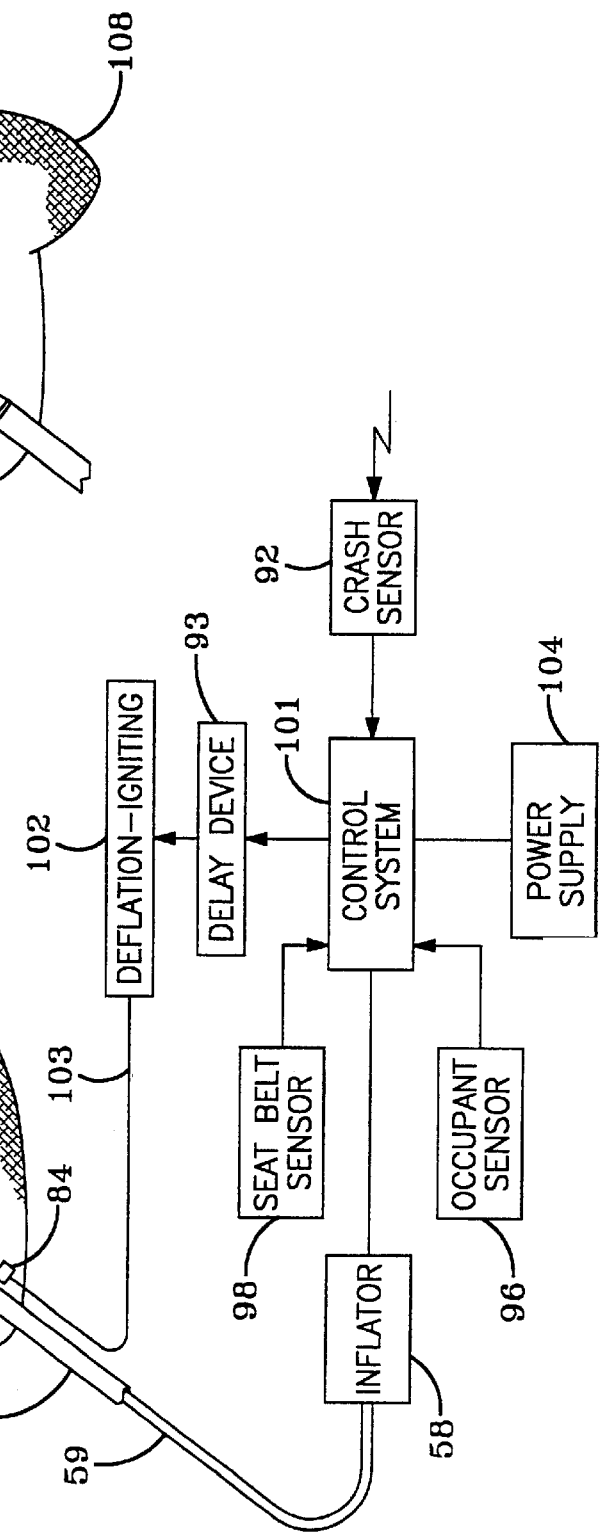

INFLATABLE AIR BAG FOR AN INFLATABLE RESTRAINT SYSTEM

BACKGROUND OF THE INVENTION

1. Field of Invention

This invention in general relates to safety restraint systems and more particularly to occupant safety restraint systems for vehicles having an inflatable member secured to a seat belt.

2. Description of the Related Art

The advances in occupant safety restraint systems as found in motor vehicles, more particularly automobiles, have steadily increased in the past years. More particularly, most vehicle systems have used a combination of one or more air bags being deployed from some structural member of the vehicle along with a seat belt.

In motor vehicles such as airplanes, the occupant safety restraint systems for passengers are still based on the seat belt. The passenger makes sure that his belt is secured about him during times of take-off and landing and during air turbulence. Safety restraint systems for air crew members, while it is still based on seat belts, add various combinations of shoulder belts.

U.S. Pat. No. 5,871,230, entitled Lap Mounted Inflatable Bag and Method of Use was issued to Donald Lewis on Feb. 16, 1999 and assigned to Universal Propulsion Company, Inc., teaches and claims a lap mounted inflatable bag and its method of use. The system is for a seated occupant including a lap belt system and an inflatable member mounted on the lap belt and restrained by the belt when inflated. The inflatable member is sized and shaped so that one inflatable member surface functions to prevent or limit inflatable member rotation by engaging a substantial area including the occupant's lap and seat thereunder. Another rearward surface restrains occupant's torso movement.

SUMMARY OF THE INVENTION

It is an advantage of the present system to provide an inflatable member that operates to restrain the occupant in his seat and to decelerate the forward movement of the occupant as long as possible. This reduces and limits any impact upon any bulkhead or other similar member in front of the occupant.

It is still another advantage to apply restraining forces against the occupant's torso, waist and thighs during the time of a sudden deceleration of the vehicle to restrain the occupant in his seat.

It is still another advantage to control the forward momentum of the occupant without endangering the occupant and resulting in leaving the occupant in a seating position in his seat after the vehicle has come to a complete stop.

It is yet still another advantage to provide a system wherein the protection provided as measured by the Head Injury Criteria, HIC, is well below presently accepted levels.

It is still another advantage of the system to include a deflation member to open the inflatable a period of time after inflation to deflate the inflatable to allow the occupant to leave the seat.

It is still another advantage to control the inflation of various sections of the inflatable for applying pressure to the occupant to push the occupant back and down into the seat.

It is another advantage of the system to appear to the vehicle occupant as little more than a slightly different seat belt with a similar buckle arrangement that the occupant has used on many previous occasions.

These and still other advantages of the present invention are found in the preferred embodiment of an inflatable air bag system for restraining an occupant in a seat during a sudden deceleration of a vehicle. The vehicle may be any land, sea or air vehicle such as an airplane, automobile or boat. The air bag has an envelope of a fabric material that is adapted to be inflated.

Attached to the envelope is a snout or fluid-receiving inlet attached for receiving inflation fluid for inflating the envelope. The inflation fluid may be any one of numerous gases depending upon certain design considerations. Of importance in the instant envelope, the inflation fluid is principally comprised of an inert gas such as argon.

The envelope in its inflated state has generally an L-shape when viewed from the side and against the occupant. The upright section of the L being a torso section that bears against the occupant's body intermediate the waist and the neck. The base of the L is a lap section that bears against the thighs of the occupant's body intermediate the waist and his or her knees. The width of the inflated envelope is substantially the width of the occupant and if the occupant is a slender occupant, the width is greater than the occupant is and conversely if the occupant is a very large occupant the width is less than the width of the occupant. Thus, the width of the inflated envelope is substantially the width of the occupant.

In order to strongly bear against the upper torso of the occupant, a rearwardly protruding section of the inflated envelope extends from the upright section of the L. This section operates so as to bear against the occupant in the area below the neck and above the waist of the occupant and produces an increased force to hold and if necessary, to return the occupant into contact with the seat. Of key importance is that the inflatable member does not come in contact with the face of the adult occupant.

A seat belt is securely attached to one surface of the envelope that is the outer or forward facing surface or the surface away from the occupant. The seat belt is connected to be tensioned by the inflation of the envelope. The attachment point is intermediate the upright section and the lap section thereby allowing fluid communication of the inflating fluid between the sections of the inflated envelope.

These and other objects and advantages will become apparent in the following drawings, detailed description and claims.

DESCRIPTION OF THE DRAWINGS

In the drawings:

FIG. 22 is a schematic of a vent system;

FIG. 23 is a side view of another embodiment of the inflatable of the present invention without occupant supporting the bag;

DETAILED DESCRIPTION OF THE PREFERRED EMBODIMENT

Figure 2:
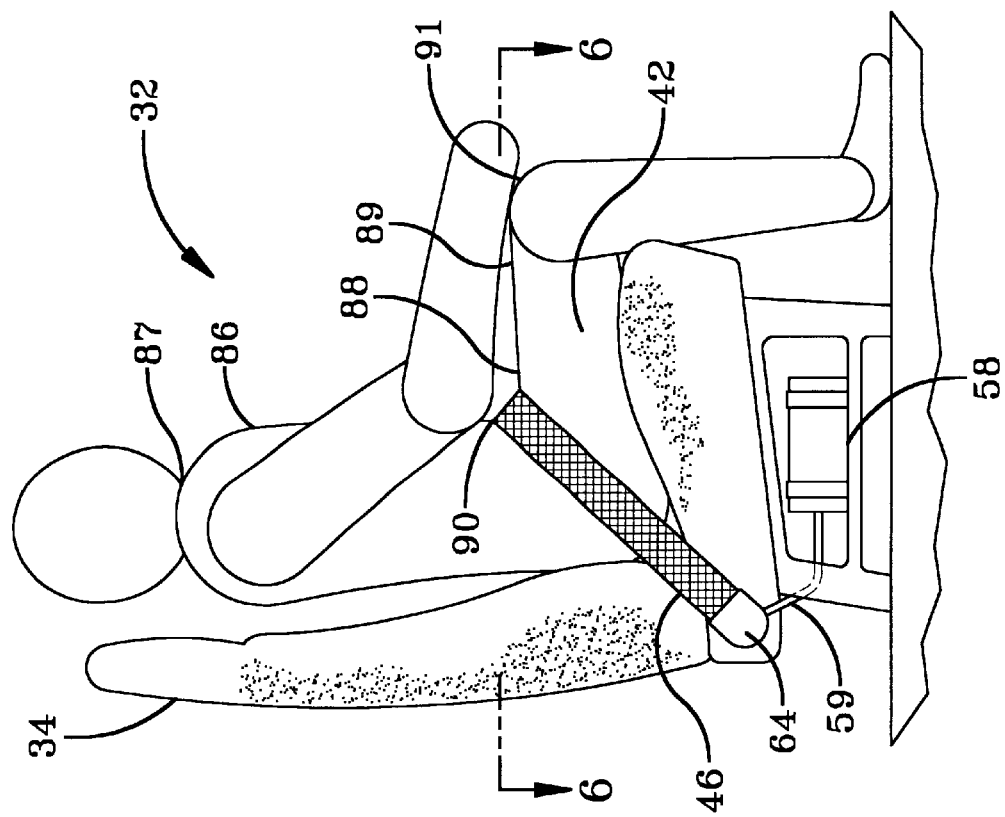
FIG. 2 is a side view of an occupant sitting in a vehicle seat with the inflatable around his waist.
Figure 1:
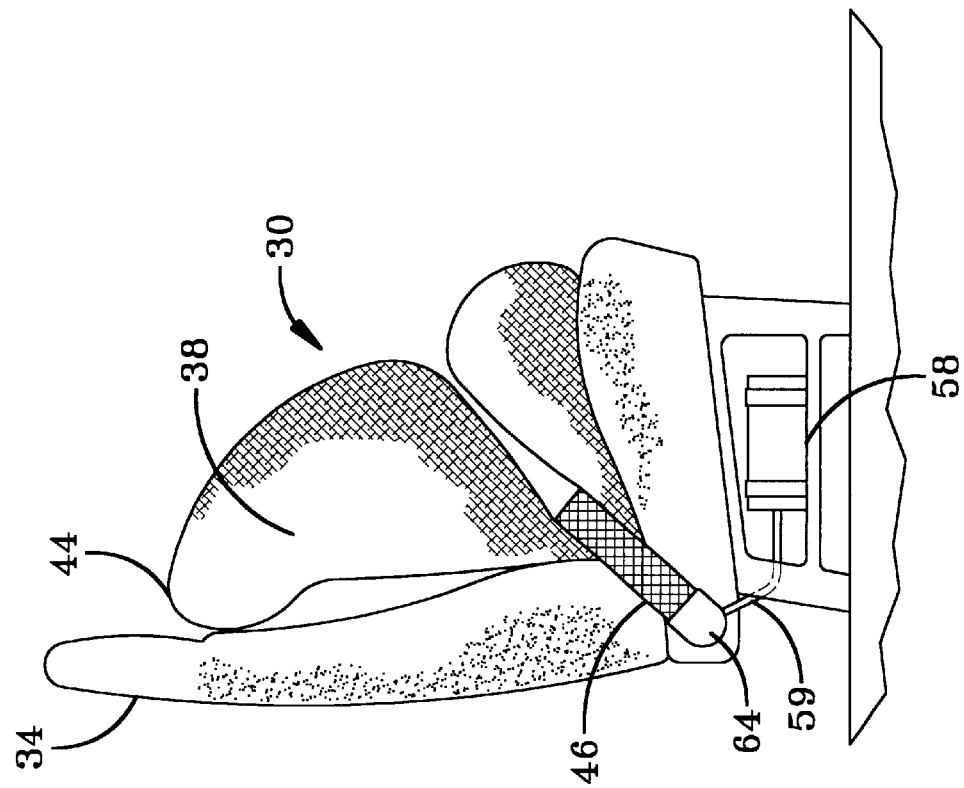
FIG. 1 is a side view of the inflatable of the present invention without occupant supporting the bag.

Referring to the figures by the characters of reference, there is illustrated in FIG. 1 a side view of the inflatable 30 or inflatable envelope of the present invention formed as it would be if inflated and in place on an occupant 32. The inflatable 30 is an air bag for restraining an occupant 32 in a seat 34 during a sudden deceleration of a vehicle, be it an automobile, an airplane, a boat or any other vehicle. The inflatable 30 has an inflatable envelope of a fabric material that is leak-proof or at least leak resistant. A fluid-receiving inlet or snout 36 is attached to the inflatable envelope 30 to receive an inflation fluid for inflating the envelope. The inflation fluid is typically an inert gas.

Figure 3:
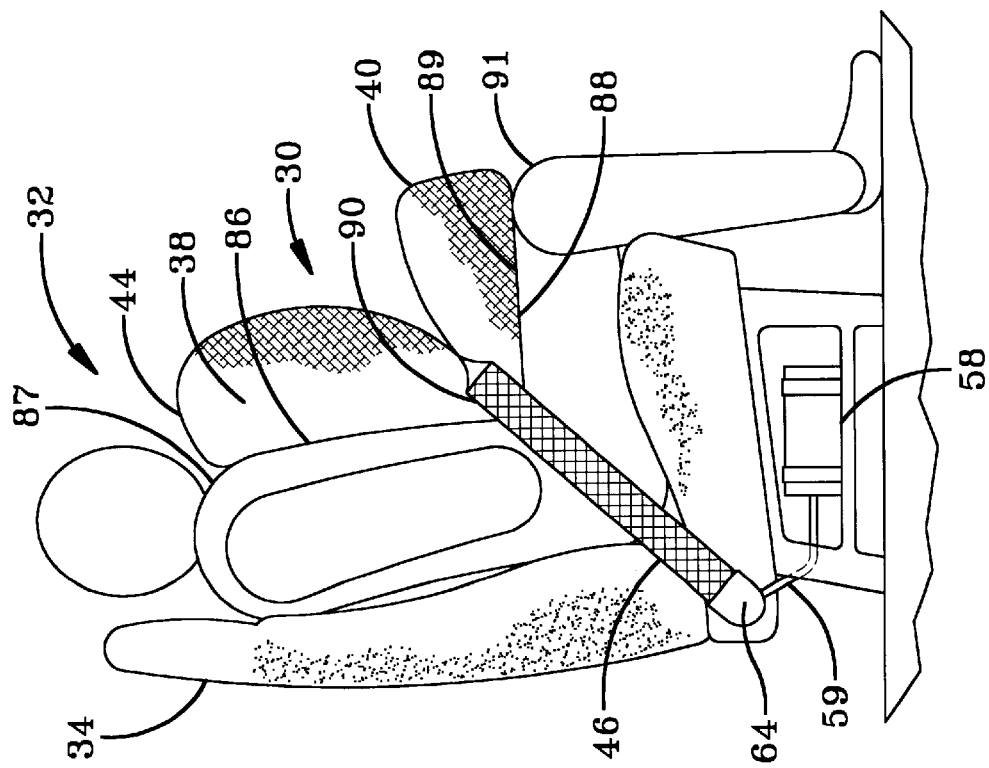
FIG. 3 is a side view similar to FIG. 2 with the inflatable inflated against the occupant.
Figure 5:
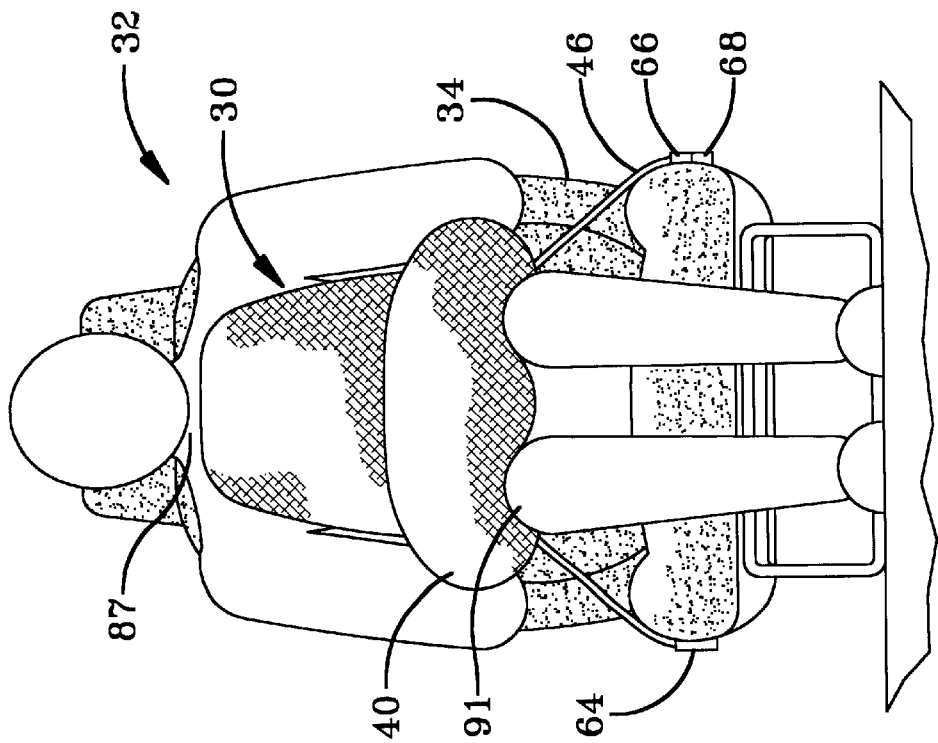
FIG. 5 is a frontal view of an occupant sitting in a vehicle seat with the inflatable inflated.

The inflated envelope 30 generally has an L shape when viewed from the side and against the occupant 32 as illustrated in FIGS. 1 and 3. The L has an upright section or torso section 38 for bearing against the body of the occupant 32 intermediate his or her waist and neck. The base or lap section 40 of the L is for bearing against the thighs 42 of the body of the occupant 32 intermediate his or her waist and the knees. As illustrated in FIG. 5, the width of the inflated envelope 30 is substantially the width of the occupant 32. This width, which is always the same, is relative to the size of the occupant 32. Typical measurements are taken on standard test dummies that represent the fifth, fiftieth and ninety-fifth percentile adult human.

A rearwardly protruding section 44 of the inflated envelope 30 extends from the upright section 38 of the L so as to bear against the occupant 32 in the area below the neck. It is to be noted that the inflatable 30 of FIG. 1 does not touch the face of the occupant adult 32, hence there should be no abrasions on the face of the occupant from the inflatable 30 being inflated.

A seat belt assembly 46 is attached through its webbing 47 to one broadside or front surface 48 of the envelope 30 intermediate the upright section 38 and the lap section 40. As viewed in the several Figs. the seat belt webbing 47 is attached to the front surface 48 of the envelope 30 in order that the other broadside surface or back surface 50 of the envelope 30 is behind the seat belt webbing 47. This allows the inflation fluid to communicate or flow between the torso 38 and lap 40 sections of the inflatable 30 behind the seat belt 46 when it is in place on the occupant 32. The seat belt assembly 46 comprises the seat belt webbing 47, the snout 36, the frangible envelope 52 (hereinafter described) and the folded inflatable 30.

Figure 10:
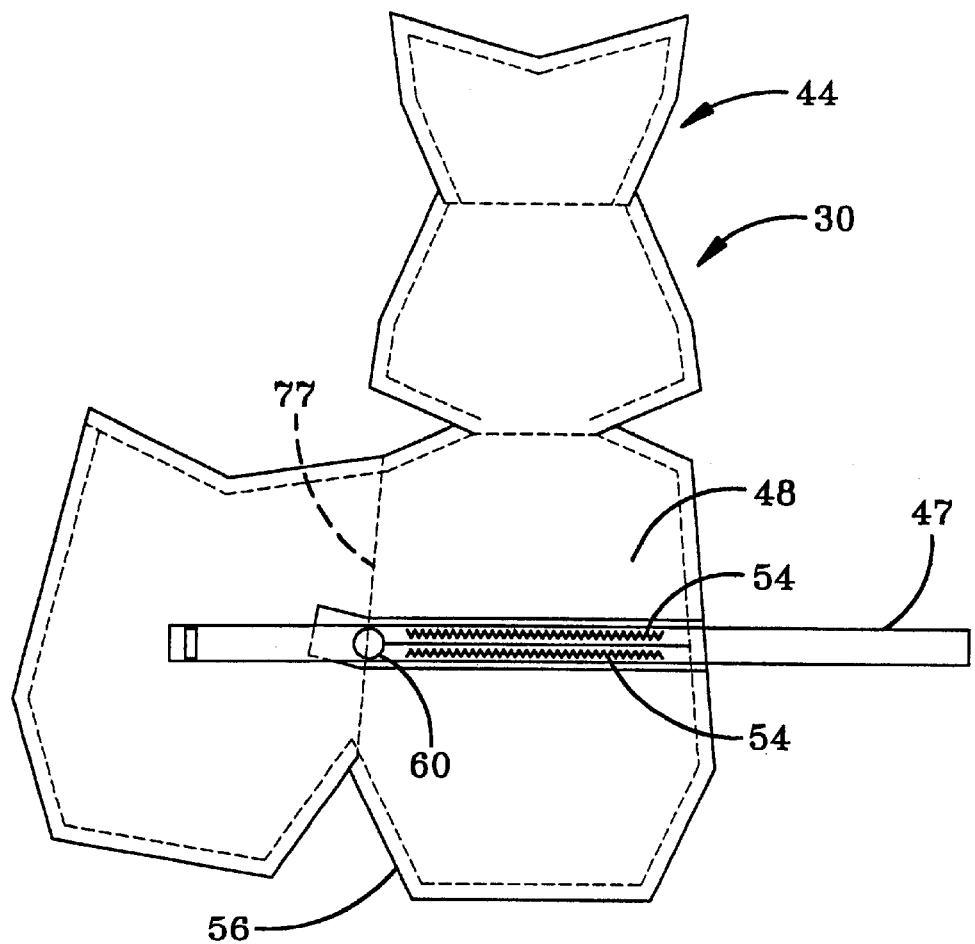
FIG. 10 is an illustration of the pattern prior to forming the inflatable of FIG. 1.

The inflatable envelope 30 is attached to the seat belt webbing 47 by one more rows of stitching 54. As illustrated in FIG. 10, the stitching 54 is a zigzag pattern extending substantially across the width of the inflatable 30. The stitching 54 extends only through the one broadside 48 of the inflatable 30 as illustrated in FIG. 10.

Figure 32:
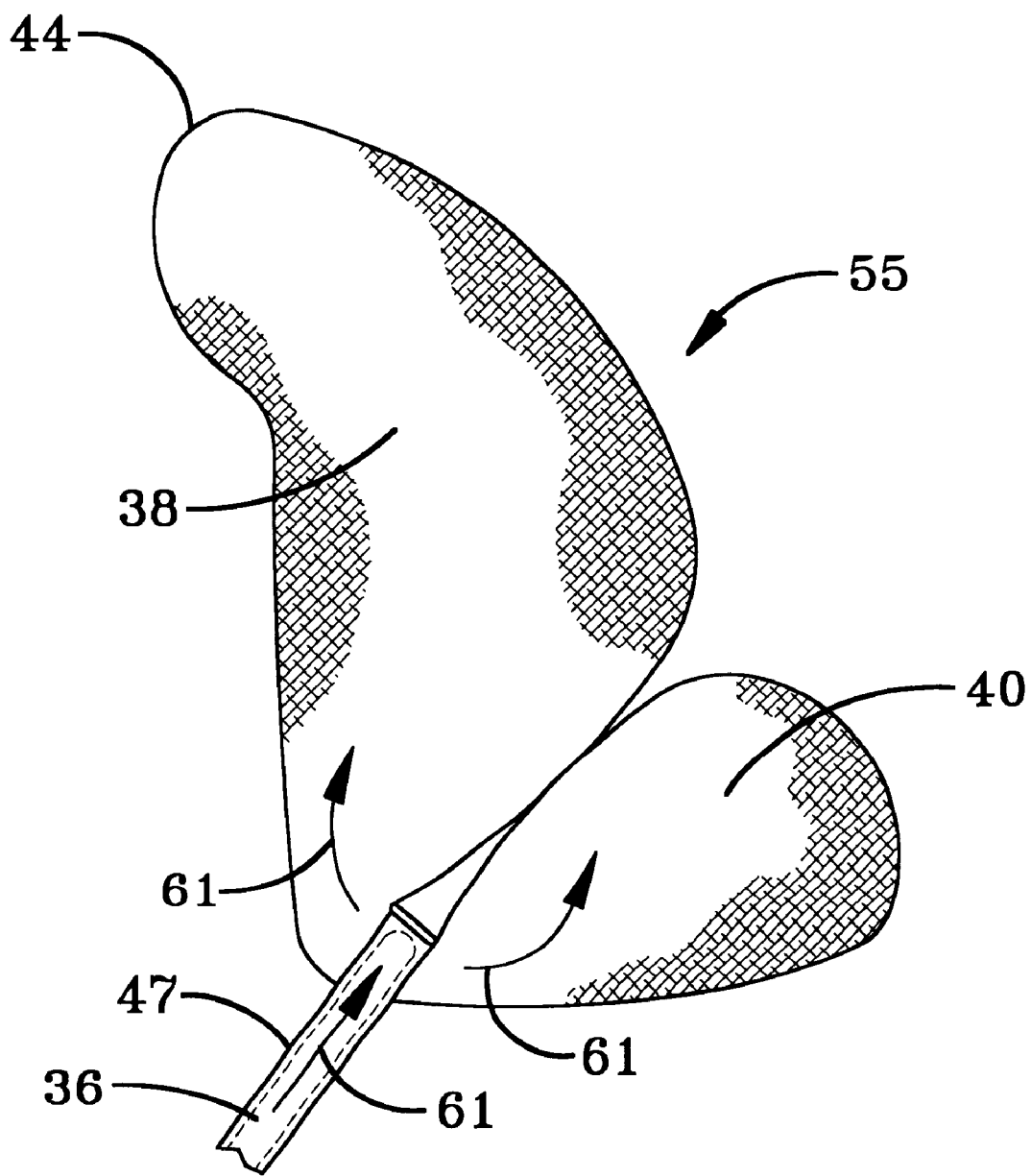
FIG. 32 illustrates an inflated seamless woven envelope.

The inflatable envelope 30 can be a seamless woven member 55 (FIG. 32) that is leak-tight or fluid retentive so as to hold the inflating fluid for a predetermined period of time.

As illustrated in FIGS. 10–13 and 16, the enclosed inflatable envelope can be an unitary sheet member 56 folded together and having matching edges joined together forming the envelope 30.

Due to the pressure and the temperature of the inflating gas used to inflate the inflatable 30, the yarn material of the inflatable or envelope 30 has a denier greater than 110 and less than 630. In fact, in the preferred embodiment the envelope 30 is a yarn material having a denier less than 210. This denier is used because the inflator 58 that is used generates only cool inflation fluid or gas and does not have any hot residue. The cool temperature of the inflation fluid does not damage the fabric. Further, as will hereinafter be shown, the construction of the frangible envelope 52 wrapped around the seat belt assembly 46 allows the low denier value of the fabric.

Figure 4:
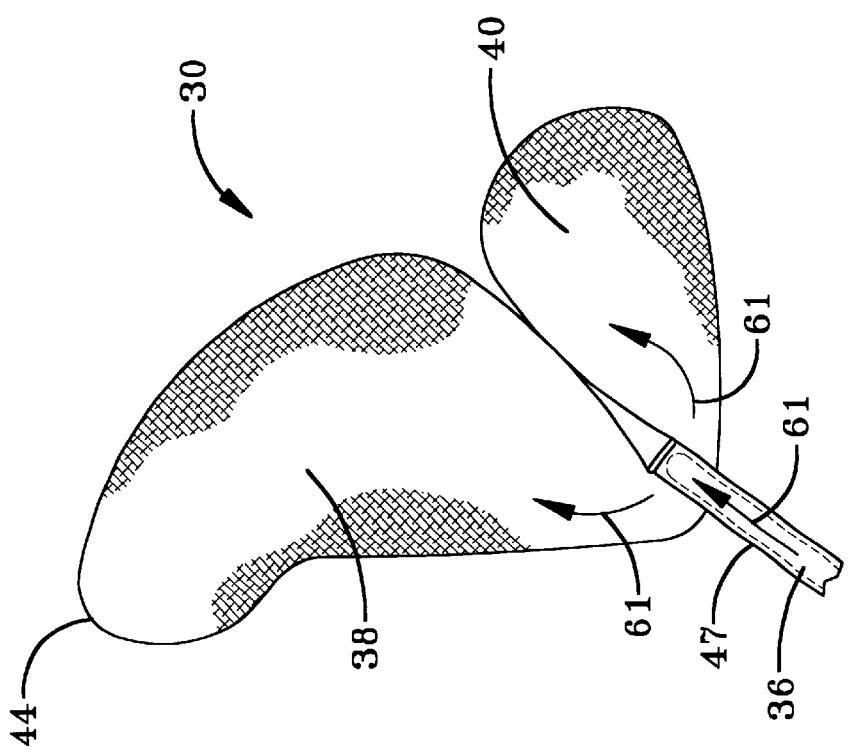
FIG. 4 is a side view of the inflatable of FIG. 1 without an occupant or seat belt showing the inflatable inlet and the path of the inflatable gas.
Figure 11:
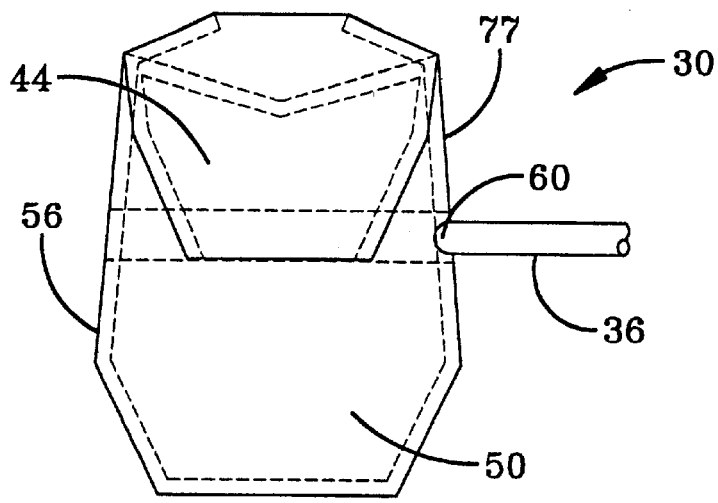
FIG. 11 is a plan view from the side opposite the occupant of the inflatable folded from the pattern of FIG. 10.

Referring to FIG. 11, there is illustrated the attachment of the fluid-receiving inlet or snout 36 to an aperture 60 in the inflatable envelope 30. The snout 36 is a tubular member fixedly attached to the aperture 60 in the envelope 30 and joined so as to make the intersection of the snout and the envelope leak proof. The arrows 61 shown in FIG. 4 illustrate the flow of the inflatable fluid into and within the inflatable. The fluid, depending upon the fold of the inflatable, will begin to flow into one section such as the torso section 38 and then into the lap section 40. The section of the inflatable behind the webbing 47 will also inflate and operate to push the occupant back into the seat.

Figure 8:
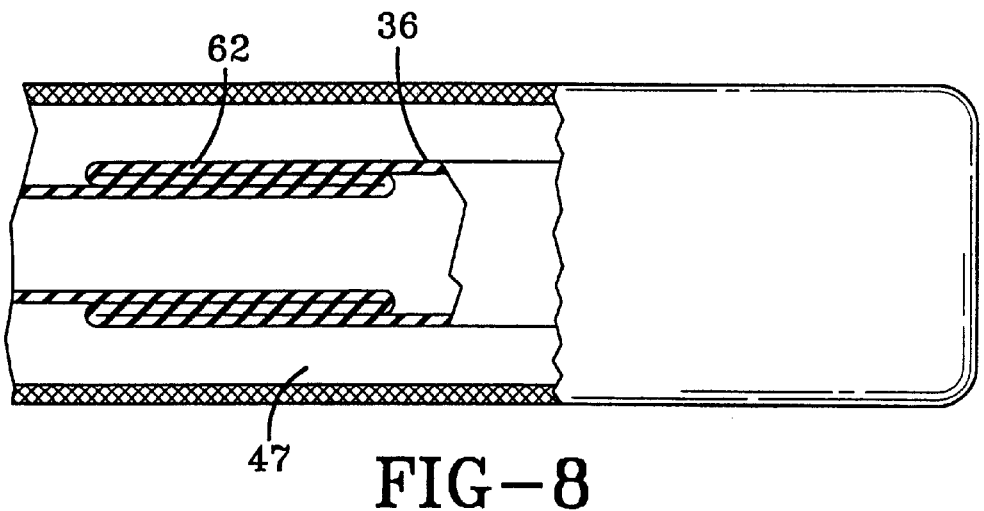
FIG. 8 is a partial section view of the seat belt with the intussusceptive fold of the inflatable inlet.

The snout 36, as illustrated in FIG. 8. has at least one intussusceptive folding 62 allowing the tubular member to elongate as the envelope 30 inflates. Another way of accomplishing an elongation allowance ability of the snout 36 is to put the intussusceptive fold 62 inside of the envelope 30. With the intussusception 62 inside the envelope 30, the snout 36 will pull from the inflatable 30 as the inflatable 30 fills with the inflatable fluid while the aperture 60 in the inflatable moves because the inflatable is expanding. Still another way is to fold the snout 36 in the form of a bellows 63, FIG. 26, so that when the snout 36 elongates, the bellows folds tend to straighten out.

The tubular member 36 is securely coupled by a conduit member 59 to an inflator 58 such as that illustrated in co-pending patent application having U.S. Ser. No. 09/329, 016 entitled "A Seat Belt Anchorage", filed Jun. 9, 1999.

In an alternative embodiment, the snout 36 can be fabricated from the webbing 47. In this embodiment, the webbing 47 is in the form of an elongated tube. When the snout 36 or the webbing, is not carrying the inflation fluid, the webbing 47 is flat. The webbing 47 is coated so that the inflatable gas can not escape, but the gas will travel to the inflatable envelope 30 and the webbing 47 will change from a flat member to a tubular member under the pressure of the inflatable fluid.

The aperture 60 in the inflatable envelope 30 is typically located in an area under the seat belt webbing 47. The seat belt webbing 47 has the fluid-receiving inlet 36 attached thereto from the end of the webbing 47 at the inflator 58 to the junction at the aperture 60 of the envelope 30.

Figure 9:
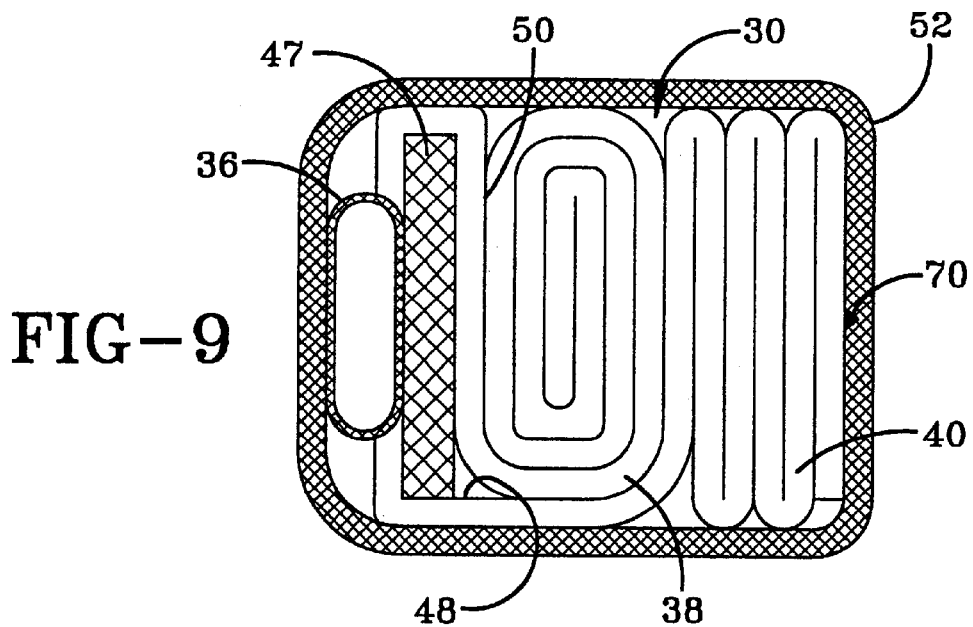
FIG. 9 is an enlarged section view taken along line 9—9 of FIG. 7.

The inflatable envelope 30 is folded or rolled on the front side broadside of the seat belt webbing 47 intermediate the ends of the webbing 47, as illustrated in FIG. 9. The folded or rolled envelope 30 extends from one broadside or front side of the seat belt webbing 47 and lies on the other broadside or back side of the seat belt webbing 47. This is also illustrated in FIG. 7 wherein the seat belt assembly 46 extends across the body of the occupant 32 typically at his or her waist.

Figure 6:
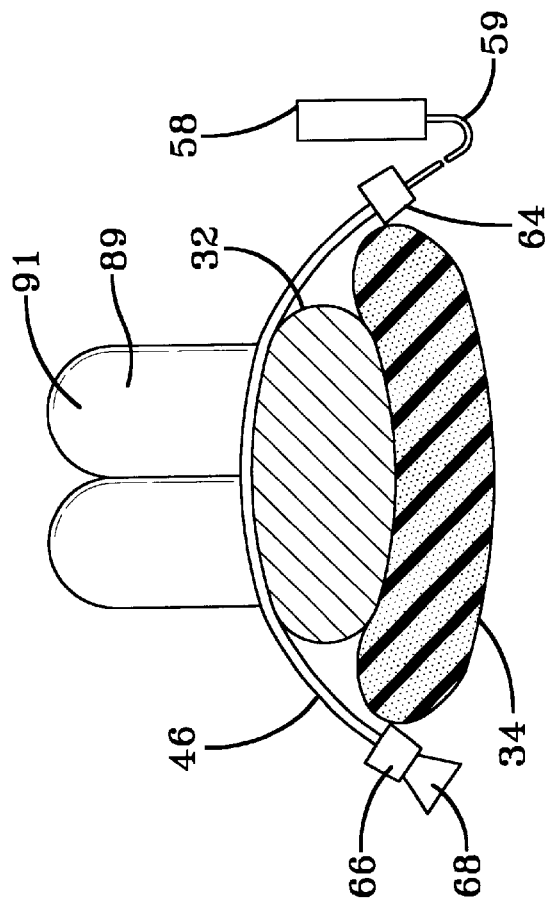
FIG. 6 is a section view taken along line 6—6 of FIG. 2 omitting the arms of the occupant.
Figure 7:
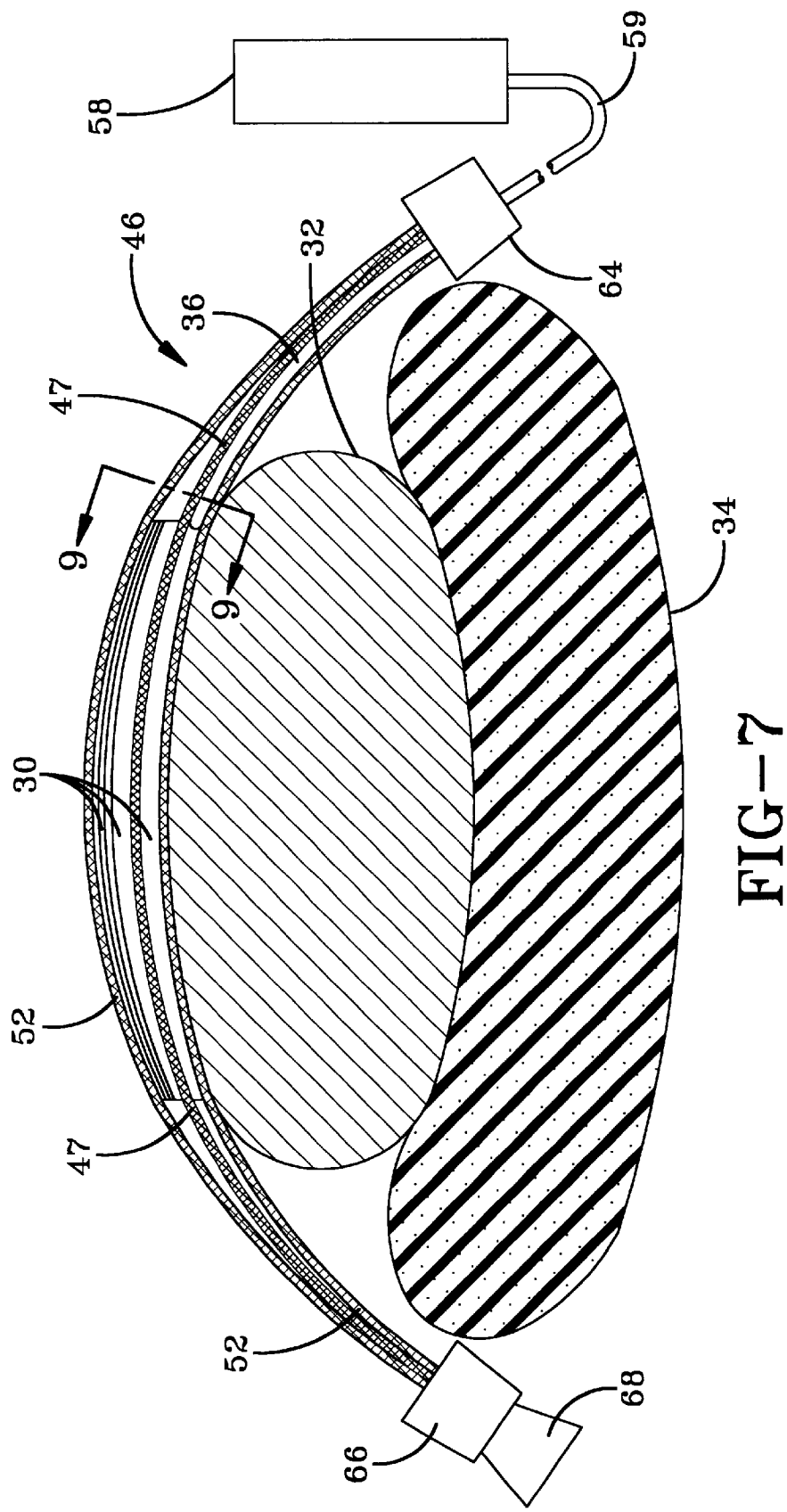
FIG. 7 is an enlarged sectional view of FIG. 6.

FIG. 7 is an enlarged sectional view of the seat belt assembly 46 of FIG. 6. The seat belt assembly 46 is attached at each end to the seat 34, its frame or a structural member attached to the vehicle. As previously stated, one end of the seat belt assembly 46 is securely coupled to an inflator 58 by a conduit member 59 through a seat belt anchor 64 and the other end is secured through a tongue 66 and buckle 68 to the seat or seat frame. The tongue 66 and buckle 68 allow the seat belt assembly 46 to be opened to allow the seat occupant 32 access to enter and to leave the seat 34.

Figure 9A:
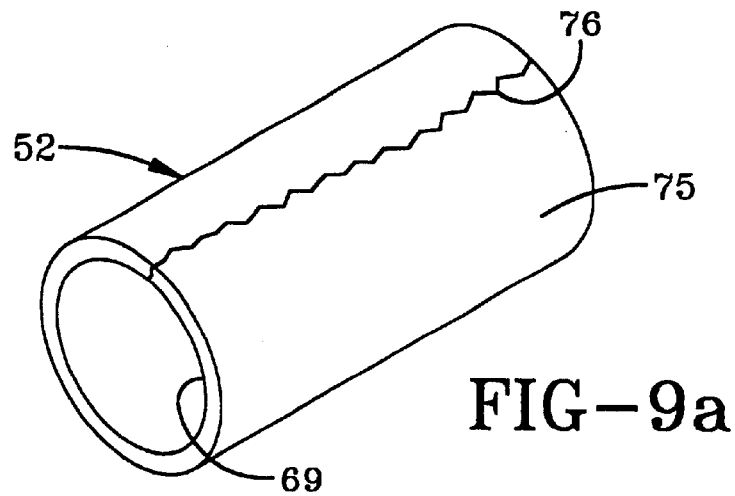
FIG. 9a is a perspective view of a sewn frangible cover.

Referring to FIG. 7, there is illustrated in sectional view the seat belt assembly 46 of the preferred embodiment with the occupant 32 in the seat. The inflatable envelope 30 is folded on the seat belt webbing 47. A frangible tubular envelope or cover 52 encloses the inflatable envelope 30 and the webbing 47. This frangible tubing 52 is described in U.S. patent application Ser. No. 09/099,858, which is incorporated herein by reference. As shown in FIG. 9A, the frangible tubing 52 can be formed by stitching, illustrated by zig zag line 76, at least two longitudinal edges of a flat material 75 together to form a tube 69 and wherein at least a portion of the stitching is weaker than the material.

This frangible cover 52 is secured to the seat belt anchor 64 at one end and the buckle 68 or tongue 66, typically the tongue 66, at the other end of the belt webbing 47. It is the belt webbing 47 that takes substantially all the loads of the inertia of the occupant 32 moving forward when the vehicle has a sudden deceleration. Loads of approximately 700 pounds, 318 Kg, are not unusual at this time. Stated another way, the inflation of the envelope caused the belt webbing 47 to be drawn very tight and will position the envelope in front of the seat occupant. The forward motion of the occupant will be greatly reduced by the belt webbing 47 tensioning action.

Figure 13:
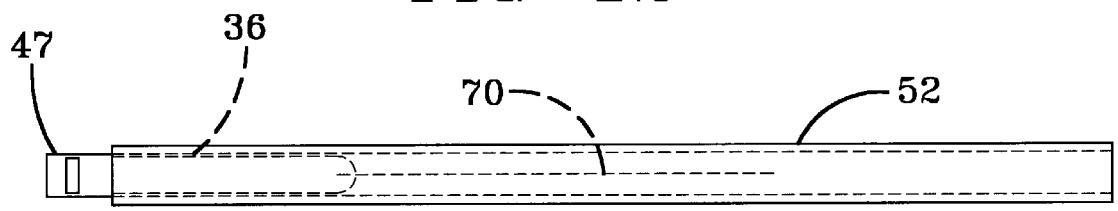
FIG. 13 is a plan view with the laser cut on the frangible tubing.

In order to allow the folded inflatable 30 to expand during inflation, the frangible tubular cover 52 has a weakened section or threads such as a laser cut 70 extending over the folded envelope 30. Many different ways of weakening the threads are possible including the laser cut of the preferred embodiment. Typically, the laser cut 70 is on the inside of the frangible cover 52 and facing toward the occupant 32. However, the laser cut 70 could be on the outside of the frangible cover 52 facing away from the occupant 32. If desired, the laser cut 70 could be on both sides of the seat belt assembly 46. In any case the laser cut 70 does not extend through the frangible cover 52, but merely functions to weaken the threads of the cover 52 to allow the cover 52 to open when the inflatable envelope 30 is being inflated. This laser cut 70 is illustrated in FIG. 13.

As illustrated in FIG. 9, the manner in which the torso section 38 and the lap section 40 are folded or rolled will determine which section 38 or 40 is to be inflated first and which section 40 or 38 will follow. The fluid-receiving tube 36 is connected to the aperture 60 in the envelope 30 under the seat belt webbing 47, but outside of the stitching 54. As illustrated in FIG. 9 the one broadside panel 48 of the envelope is located against the side of the webbing 47 facing the occupant 32. The envelope 30 is then folded or rolled by sections 38, 40, i.e. torso or lap. However, the waist section of the envelope 30 is located behind the webbing 47. Once the inflatable fluid enters the envelope 30, the waist section of the envelope 30 inflates first and the inflatable fluid then communicates with the torso 38 and lap 40 sections.

Figure 14:
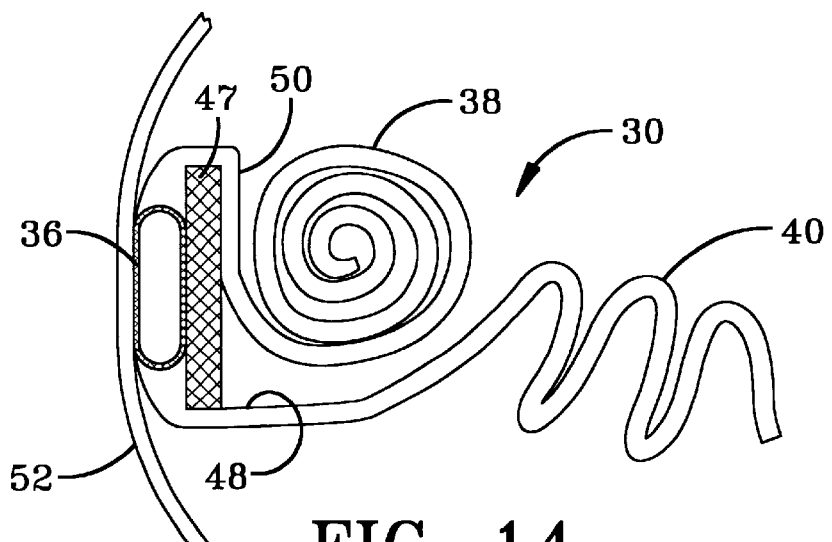
FIG. 14 is a schematic view of one form of folding both the torso and lap sections on the belt webbing.
Figure 18:
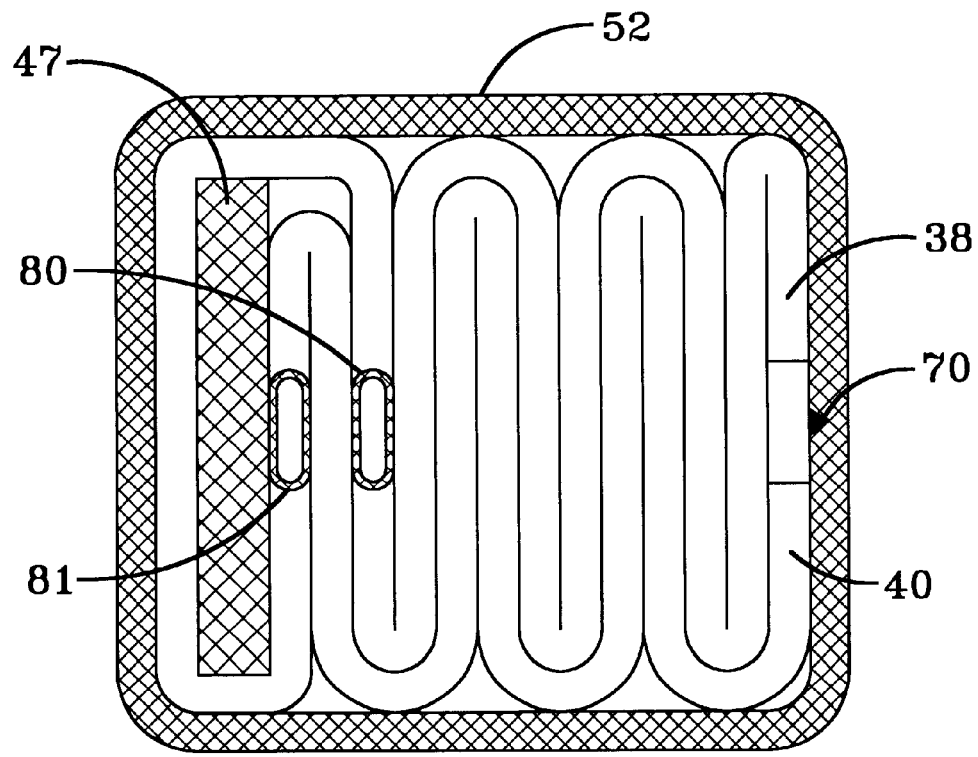
FIG. 18 is similar to FIG. 9 but with the bifurcated snout.

There are many ways to fold or roll the sections to store the sections on the seat belt webbing; for the purposes of this description the terms fold and roll are used interchangeably depending upon the type of folding or rolling. The sections can be folded in an accordion or serpentine pattern as illustrated in FIG. 14 and schematically illustrated in FIG. 24j. The sections can be rolled in a manner such as found on a blow toy wherein the closed end of the toy is rolled back on the open end so that when a person fills the open end with air, the closed end rolls out to its extended length. As long as one section is folded or rolled on the other section, the section that is farthest from the seat belt webbing 47 will be the first to inflate along with the waist section. In FIG. 14, the lap section 40 being the topmost section will inflate first and as soon as the accordion pleats begin to open up, the torso section 38 will inflate. If it is desired to have the torso and lap sections 38, 40 inflate simultaneously, both sections can be bumper-rolled, see FIGS. 24p and 24q, that is each section rolled or folded and both sections butt each other or accordion-folded together as illustrated in FIG. 18 and FIG. 24k. In short, depending on which section is to be inflated first, that section is the topmost rolled or folded section and if both are to be inflated simultaneously the sections are placed side-by-side, or accordian folded as illustrated in FIG. 18, on the seat belt webbing 47. After the sections are placed about the seat belt webbing 47, the frangible envelope cover 52 is placed over the folded inflatable envelope 30 and extends down the seat belt webbing 47 to both ends of the seat belt webbing.

Figure 21:
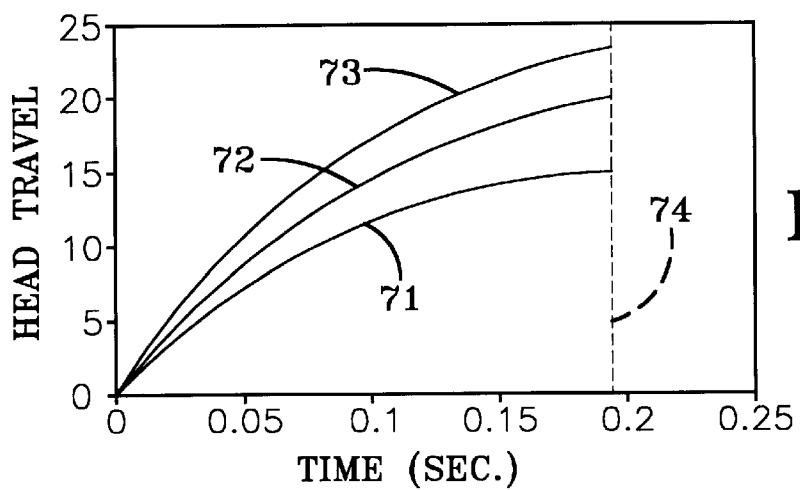
FIG. 21 is a time vs. distance graph of 5th percentile, 50th percentile, and 95th percentile human pivoting about its seat belt.

In FIG. 21, the path of the head 71–73 of the occupant 32, whether the occupant is a fifth 71, a fiftieth 72, or a ninety-fifth 73 percentile occupant, is illustrated as pivoting from the junction of the x, time, and y, head travel, axis. Depending upon the pressure and the actuation time of the inflatable envelope 30 of the preferred embodiment, the head of the occupant 32 is restrained from reaching the bulkhead or instrument panel, not shown, in front of the occupant. The y-axis is the distance traveled due to the amount of inflation fluid and the size of the occupant 32.

As the occupant 32 pivots about his hips or pelvic joints, the torso section 38 of the inflatable 30 folds into the lap section 40. To minimize rebound of the occupant 32, it is desirable to deflate the envelope 30 a predetermined time $T_v$ 82 after inflation. The inflation fluid must be retained within the envelope for a period of time sufficient for the crash event to be concluded, but it should be dissipated quickly enough so as to reduce any rebound or hindrance to the occupant to egress from the seat. Allowing the occupant easy egress is important, because in some vehicles such as airplanes, fire is a frequent associate with a crash and is a significant contributor to an occupant's death.

Figure 20:
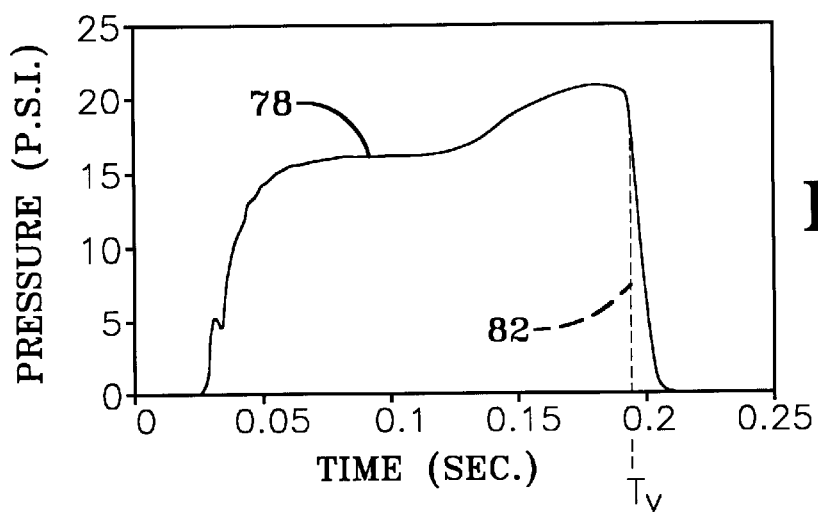
FIG. 20 is a time vs. pressure graph of the inflation of the inflatable of FIG. 1 until the vent is actuated.

In FIG. 20 an inflation curve 78 is illustrated. The predetermined time $T_v$ 82 is less than 200 milliseconds in FIG. 20. If the inflation curve 78 illustrated in FIG. 20 is for a fifth percentile person, the inflation curves for the fiftieth percentile person has a higher curve and the ninety-fifth person is still higher.

If deflation time were based on the pressure in the envelope 30 as determined by the fifth percentile occupant, it is seen that a fiftieth or ninety-fifth percentile occupant would not have the benefit of a properly inflated envelope 30. However, a predetermined time $T_v$ 82 after inflation, each occupant regardless of size will be at the forward most distance from the seat, i.e., the y-axis in FIG. 21. If the envelope 30 would be deflated at this time $T_v$ 82, the occupant 32 may not rebound back into the seat 34 and the seat belt webbing 47 and the inflatable envelope would restrain the occupant 32. It is interesting to note, that regardless of the characteristic of how the sudden deceleration occurred, FIG. 21 shows that the time that the occupant is at the forward-most distance from the back of the seat does not vary much from a fifth to ninety-fifth percentile occupant.

To accomplish this deflation, a deflation member 84 is in contact with the envelope 30. The deflation member 84 operates to allow the inflation fluid to escape from the envelope 30 by weakening the envelope and have the bag pressure rupture the envelope 30. This deflation member 84 may be an electrically heated element that is placed in contact with and secured to the envelope 30. In another embodiment the deflation member 84 may be a pyrotechnic fuse or a piece of chemically heated matter in contact with the envelope 30 that can be heated or ignited a predetermined time $T_v$ 82 to open the envelope 30. Another form of a deflation member 84 is one or more holes in the envelope 30 that are sized to control the escape of the inflation fluid. Still another form of a deflation member may be mechanical such as a BB or small ball bearing, a knife-edge, a point, to name but a few such devices.

Figure 15:
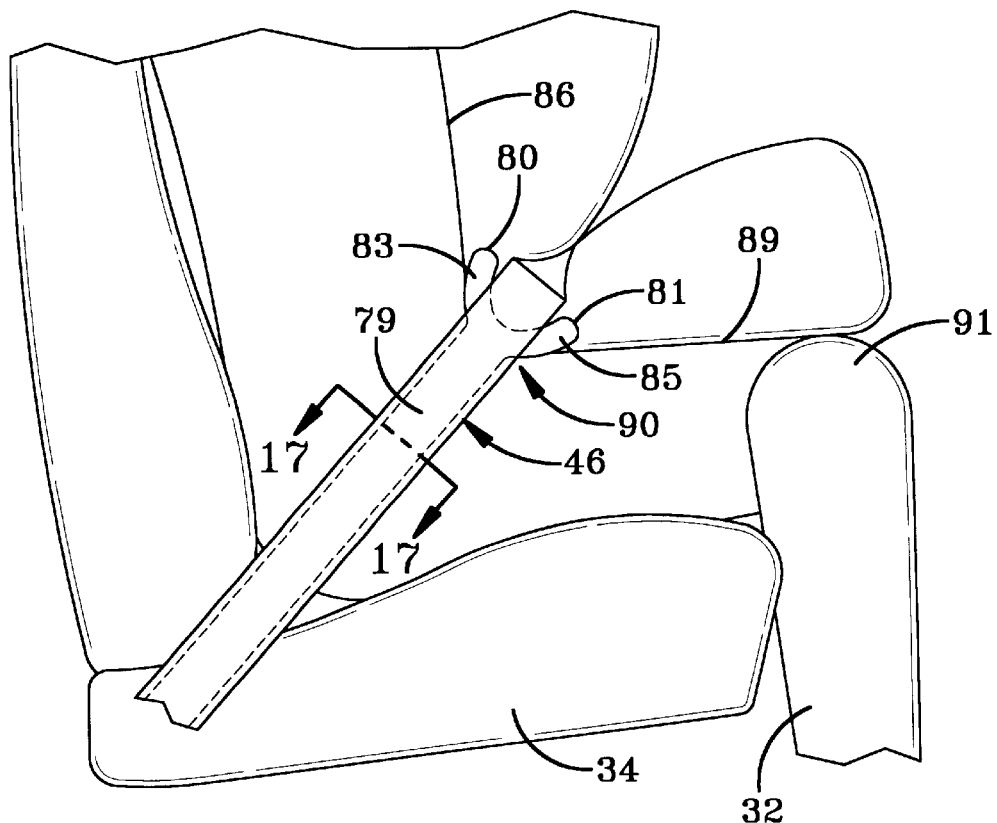
FIG. 15 is a side view of the inflatable showing the bifurcated snout.
Figure 16:
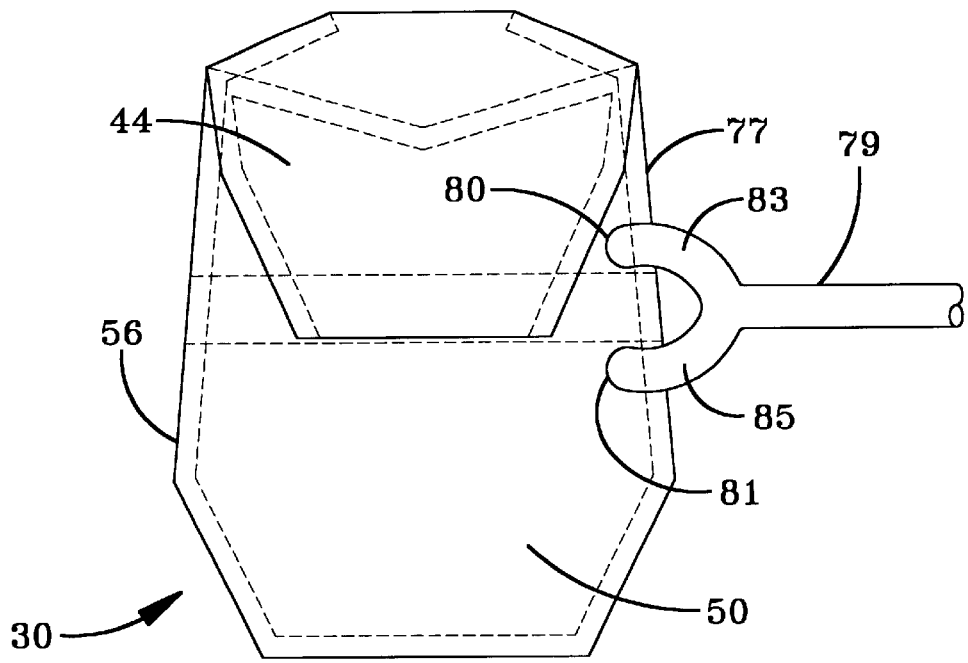
FIG. 16 is a plan view from the side opposite the occupant of the inflatable folded from the pattern of FIG. 10 but with the bifurcated snout.
Figure 17:
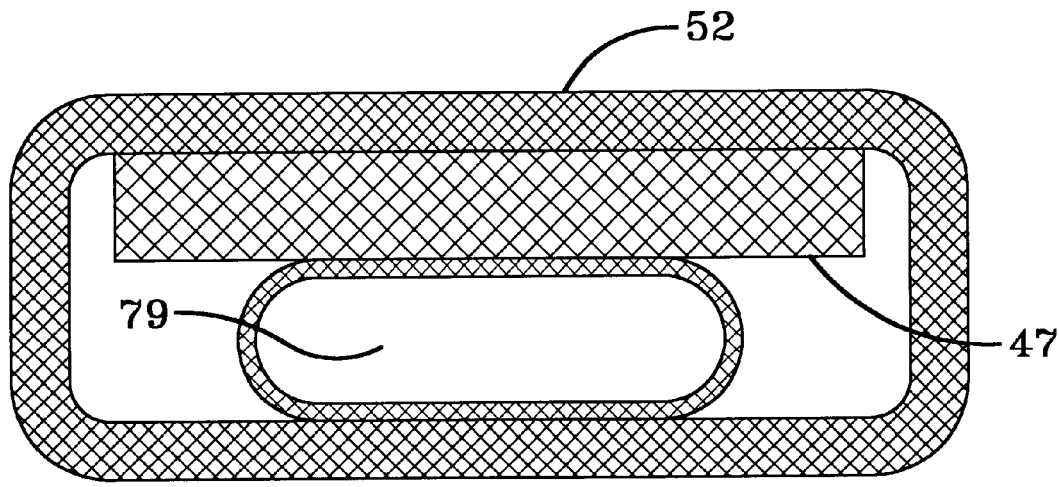
FIG. 17 is a sectional view taken along line 17—17 in FIG. 15.

Referring to FIGS. 10–13 and FIG. 4 there is illustrated the steps of a method of manufacturing an integral inflatable air bag 30 and seat belt webbing 47 for use in a vehicle for restraining an occupant 32 in a seat 34 during a sudden deceleration of the vehicle. The FIGS. 10–13 also apply to the bag illustrated in FIG. 15 with the main difference is the fluid-receiving inlet 79 having bifurcated outlet extensions 83, 85.

The first step is to make and cut a unitary flat pattern of the envelope 30 from a fabric material. The material may have a denier from 110 to 630. In the preferred embodiment the denier is less than 210. In the alternative, weaving a seamless envelope may form the envelope 30.

Next an aperture 60 is formed in the material intermediate the length of the broadside 48 and in the preferred embodiment, the aperture 60 lies along the folded side seam 77 in the case of the flat pattern envelope. A fluid-receiving inlet tube or snout 36 is attached in a leak-tight manner to the aperture 60 of the envelope 30.

In the envelope 30 having the bifurcated snout 79, the step of forming the aperture is forming two apertures 80, 81 along the folded side seam and on either side of the webbing 47. As the inflatable or envelope 30 has two gas or fluid filled sections 38, 40 which are in communication by a passage behind the seat belt webbing 47, it is sometimes possible that one of the sections 38 or 40 might receive more gas or gas at a higher rate. This results in one section filling quicker and the tightening of the seat belt as the bag fills. This prevents the passageway behind the belt from inflating due to the high bag pressure pushing against the seat belt. It is for this reason that a bifurcated snout has one outlet extension 83 connected to the aperture 80 and the other outlet extension 85 connected to the aperture 81. This bifurcated snout mechanism achieves the desired inflation of the inflatable illustrated in FIG. 15.

Figure 12:
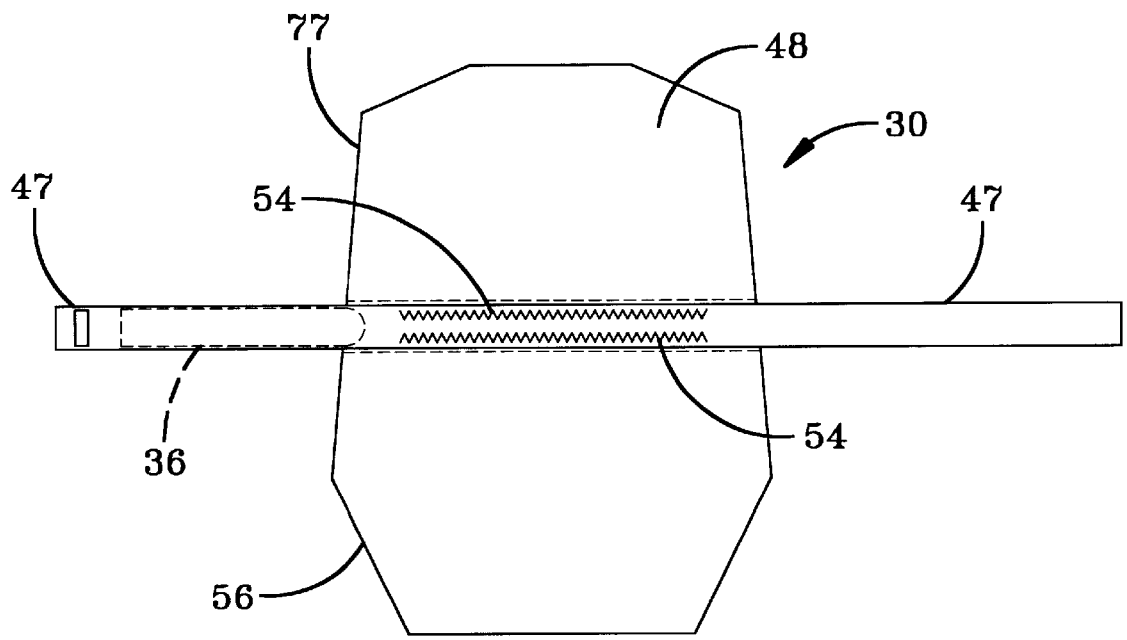
FIG. 12 is a plan view from the side adjacent the occupant of the inflatable folded from the pattern of FIG. 10.

As indicated in FIG. 12, a seat belt having an elongated webbing 47 of material with a front side and a rear side is stitched 54 to the envelope intermediate the ends of the envelope 30. The stitching 54 forms a leak tight seam. The seat belt webbing 47 functions to divide the envelope 30 into a torso section 38 and a lap section 40. The rear side of the seat belt webbing 47 is in contact with one broadside or front surface 48 of the envelope and the stitching 54 extends through that broadside surface of the envelope 30 and through the elongated seat belt webbing 47.

The material is then folded along one side seam 77 that extends from the ends of the front and back broadside surfaces 48, 50 so as to match substantially all of the perimeter. The uppermost part of the pattern, which will become the rearwardly protruding section 44 is folded down over the back broadside 50. Then, the folded flat pattern is secured along the perimeter to create a substantially leak tight envelope 30.

As illustrated in FIG. 9, the lap and torso sections 40, 38 are folded or rolled. One of the lap or torso sections is located on the stitching 54 on the front side of the webbing and the other lap or torso section is located on the one section. The two sections overlie the front side of the seat belt webbing 47 forming a folded envelope 30.

The folded envelope 30, the fluid-receiving inlet 36 or the bifurcated fluid-receiving inlet 79 and the seat belt webbing 47 are then enclosed in a frangible envelope cover 52. A belt anchor member 64 and a belt tongue 66 or buckle 68 member are attached to the opposite ends of the seat belt webbing 47.

Prior to enclosing the envelope 30, the fluid-receiving inlet 36 and the seat belt webbing 47 forming a seat belt assembly 46, the frangible tubing has a seam laser cut 70 on the frangible envelope 52 cover so as to have the cut 70 overlay a portion of the folded envelope 30.

In another embodiment, an inflatable seat belt restraint system is for restraining an occupant in a seat of a vehicle during the time period that the vehicle is undergoing a sudden deceleration. The inflatable restraint system has an occupant seat 34 secured to the vehicle. The seat normally supporting an occupant 32 having a torso body portion 86, a neck portion 87, a lap portion 88 including a thigh portion 89, a waist portion 90 intermediate the body portion 86 and the lap portion 88 and a knee portion 91.

A seat belt assembly 46 with a seat belt webbing 47 having two end portions and an intermediate portion is shown in FIG. 5. One end portion of seat belt webbing 47 has a tongue 66 and buckle 68 member for opening the seat belt assembly 46. The other end portion is secured by a seat belt anchor 64 to the side of the seat 34, either attached to the seat frame or attached to another structural member of the vehicle such as the floor, or a side pillar. The buckle 68 member is connected to the seat 34 and thus, when the occupant 32 is in the seat and buckled up, the seat belt assembly 46 is across his or her waist holding him or her in the seat. A first sensor 92, often called a crash sensor, responds to the sudden deceleration of the vehicle to generate an electrical signal indicating the sudden deceleration.

An air bag envelope 30 is folded about the seat belt webbing 47 such that the webbing has a portion of the airbag envelope on both sides of the webbing. The air bag envelope 30 has a waist section around the webbing, a torso section 38 and a lap section 40 on either side of the webbing.

Figure 26:
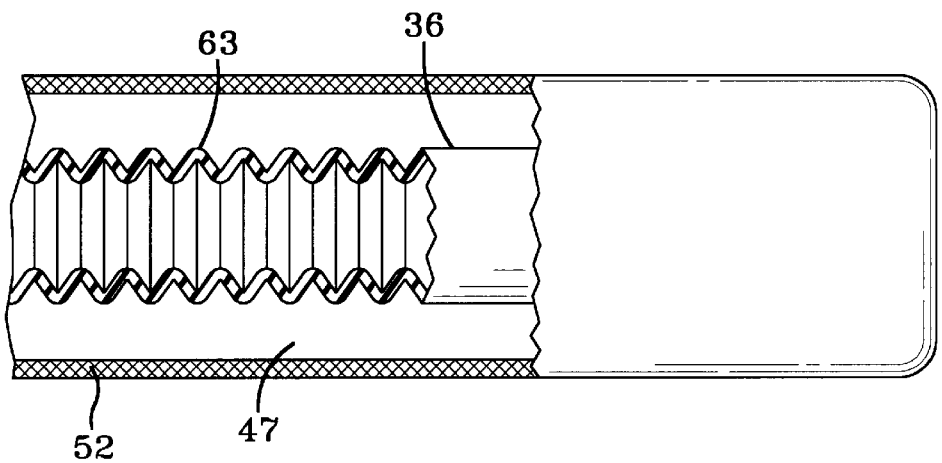
FIG. 26 illustrates a bellows fold of the tubular member.
Figures 25, 27:
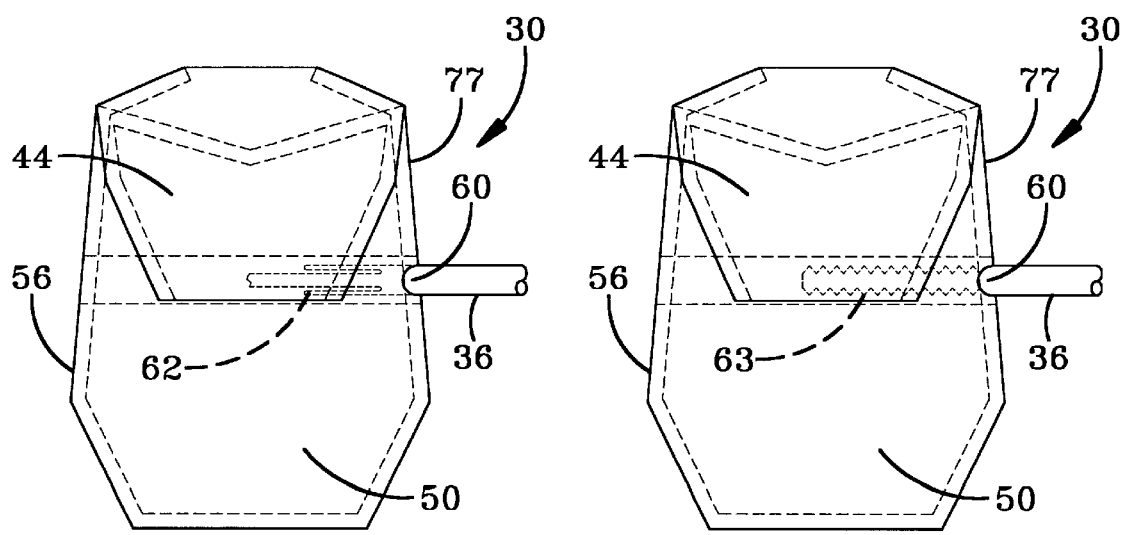
FIG. 25 illustrates an intussusceptive fold of the tubular member within the envelope.
FIG. 27 illustrates a bellows fold of the tubular member within the envelope.
Figure 28:
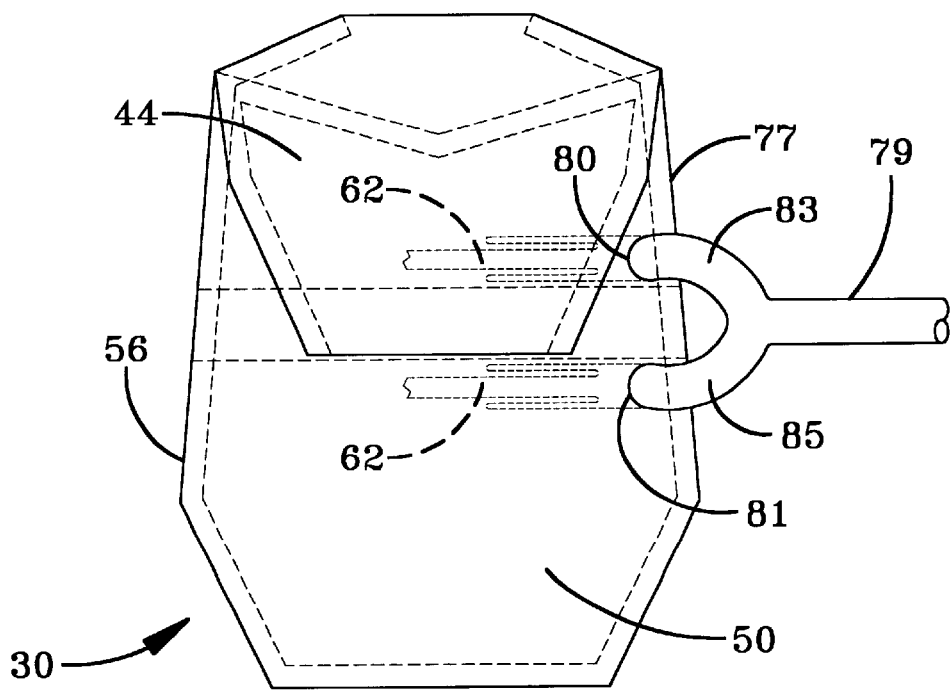
FIG. 28 illustrates an intussusceptive fold of the tubular member within the envelope having a bifurcated snout.
Figure 30:
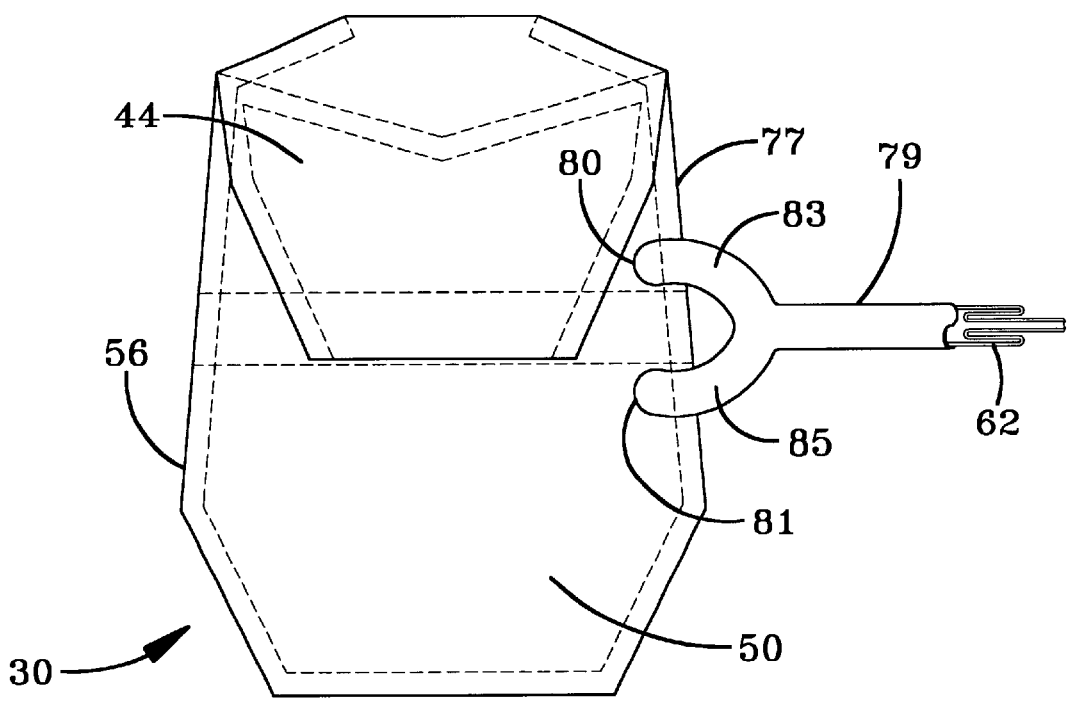
FIG. 30 illustrates a bifurcated snout with an intussusceptive fold outside the envelope.

Attached to the air bag envelope 30 is a fluid-receiving inlet or snout 36 or a bifurcated snout 79 to receive inflation fluid for inflating the air bag envelope. The fluid-receiving inlet 36 is a tubular member fixedly attached, at one end, to the envelope 30. To permit the tubular member 36 to elongate as the envelope is inflated, at least one intussusceptive fold 62 or a bellows-folding formation 63 of the tubular member may be used in the tubular member as illustrated in FIGS. 8 and 26. The location of the intussusception 62 may be along the seat belt webbing 47 (FIGS. 8 and 30), or inside the envelope 30 (FIG. 25). In the case of the bifurcated snout, if the intussusception is inside the envelope it must be in both outlet extensions 83 and 85 (FIG. 28). The other end of the tubular member is coupled to an inflator 58.

Figure 29:
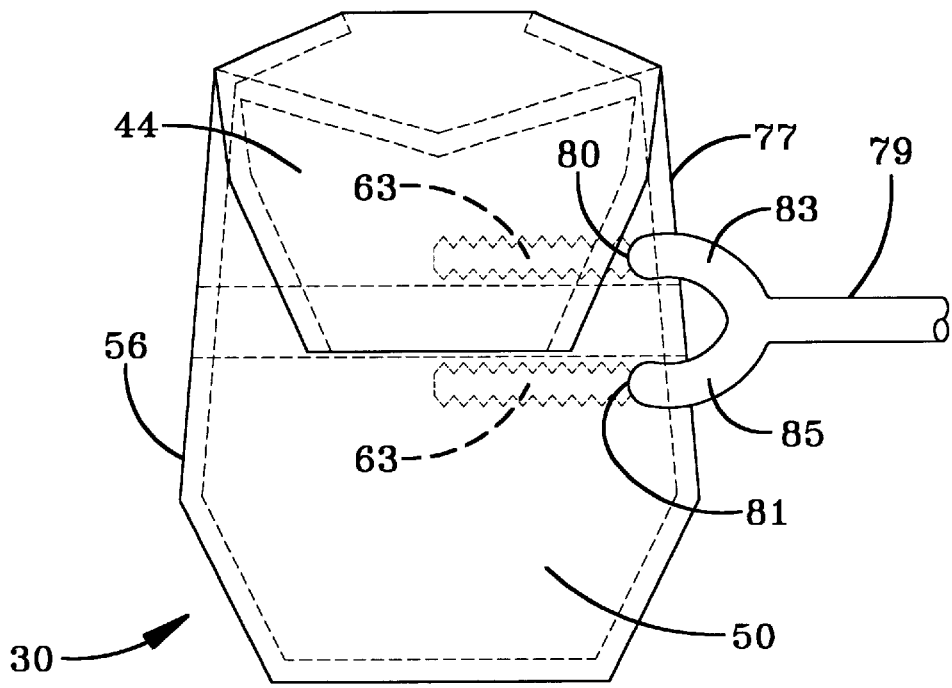
FIG. 29 illustrates a bellows fold of the tubular member within an envelope having a bifurcated snout.
Figure 31:
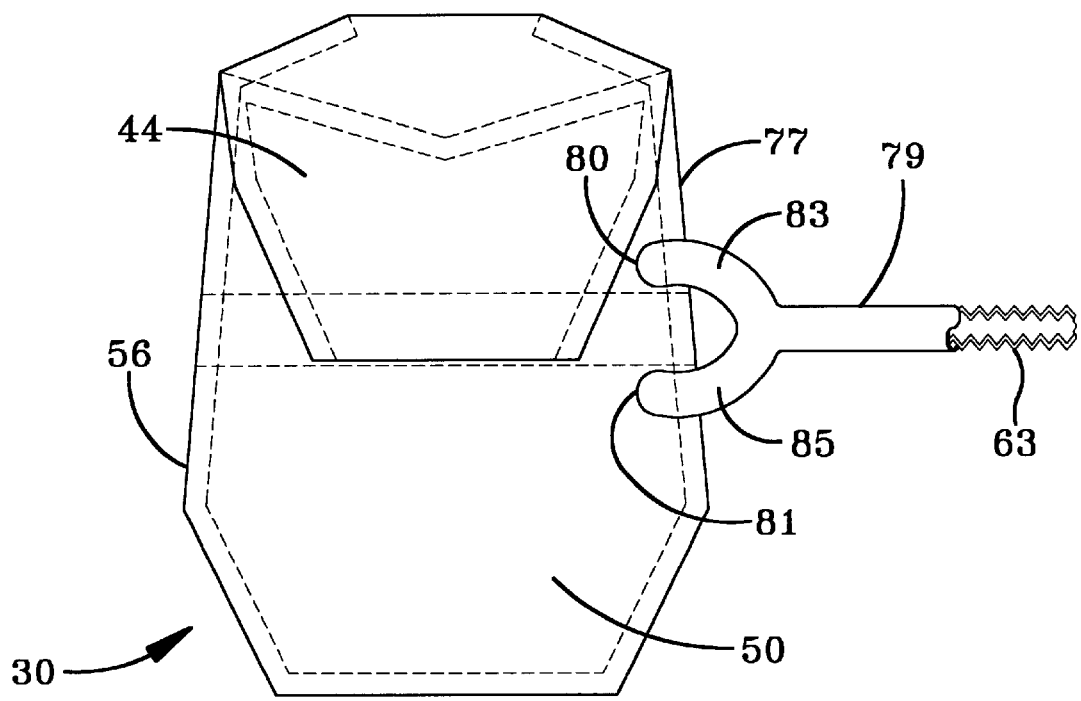
FIG. 31 illustrates a bifurcated snout with a bellows fold outside the envelope.

The location of the bellows-folding formation 63 may be along the seat belt webbing 47 as shown in FIGS. 26 and 31. In the alternative, the bellows-folding formation 63 may be inside the envelope 30 as shown in FIG. 27. In the case of the bifurcated snout, if the bellows-folding formation 63 is inside the envelope it must be in both outlet extensions 83 and 85, as shown in FIG. 29.

Figure 19:
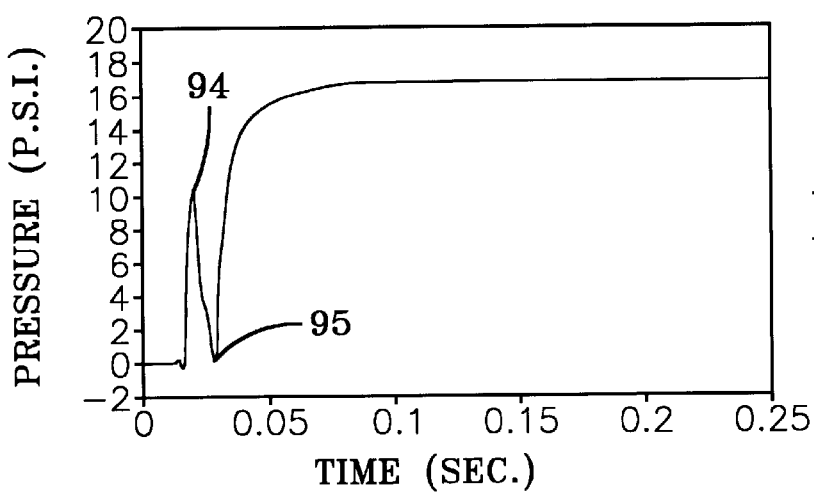
FIG. 19 is a time vs. pressure graph of the inflation of the inflatable of FIG. 1.

A frangible tubular cover or envelope 52 is placed around the air bag envelope 30, the seat belt webbing 47 and the fluid-receiving inlet 36. An inflator 58 is coupled to the inflation fluid-receiving inlet 36 upstream from the envelope 30 and responds to the first sensor 92 to supply inflation fluid to the air bag envelope 30. The inflation fluid initially inflates the waist section of the folded air bag envelope 30 between the seat belt webbing 47 and the occupant 32 for tightening seat belt assembly 46 in tension. As illustrated in FIG. 19, the pressure at the inflation tube 36 rises quickly to a high value 94 and then as the air bag envelope 30 begins to expand, the pressure drops very significantly to a low value 95 before it again rises. This high-pressure increase 94 is due to the envelope 30 being initially folded and not yet having sufficient open volume to accept the fluid or gas flow without an increase in pressure.

When the envelope expands, the torso section 38, the rearwardly extending section 44 and the lap section 40 apply a pressure against the torso body portion 86, the waist portion 90 and the lap portion 88 of the occupant to push the occupant back and down into the seat 34 during the sudden deceleration or crash of the vehicle. It has been found in testing on a 50% percentile male dummy, the Head Injury Criteria, HIC, was less than 100 relative to a present HIC standard requirement of 1000.

The air bag envelope 30 is attached to the seat belt webbing 47 by at least one row of stitching 54. In the preferred embodiment the stitching is in a saw-tooth or zigzag pattern utilizing, relative to the strength of the fabric, a weak thread. The advantage of this pattern and the stitching is that it is both frangible and possess high elongation characteristics such that during inflation, the seat belt webbing 47 will not interfere with the positioning of the envelope 30 or over-stress the thin envelope fabric to the point of failure. A small length of the stitching 54 typically will fail facilitating the bag movement. In addition, the stitching is a limited strength attachment and reduces the amount of envelope reinforcement required. In the alternative, the envelope could be attached to the seat belt webbing by a high elongation, frangible bonding, or gluing, etc.

The air bag envelope is formed of a material having a denier greater than 110 and less than 630. In the preferred embodiment the material has a denier less than 210. The required denier of the material is a function of the temperature of the inflation fluid, the amount of hot solid residue from the inflator 58, the construction of the envelope, the pressure inside the envelope and the method of attaching the envelope to the seat belt webbing 47 to name but a few of the characteristics. In the preferred embodiment, the temperature of the inflation fluid is very, very low, approximately ambient temperature, and the inflator 58 generates all non-toxic fluid or gas having no solid residue from the chemical used to generate the fluid.

The system controlling the inflatable seat belt restraint system may additionally include a second sensor 96 to indicate the presence of occupant 32 in the seat 34. If an occupant is not in the seat, the system will not inflate the envelope 30. Another optional sensor 98 to indicate that the seat belt assembly 46 is joined together at its tongue 66 and buckle 68 members may also be present. This sensor 98 will prevent inflation if the belt is not, for all intents and purposes, located around an occupant 32 and buckled. An inflatable seat belt assembly 46 that is not properly in use may move around when the inflatable fluid is released into the envelope 30. Coupling all three sensors 92, 96, 98 together, the inflator 58 will be responsive and supply inflatable fluid if there is a sudden deceleration of the vehicle and the occupant 32 is seated and is properly bucked up. All other combinations will result non-inflation of the envelope. Any one of these conditions not being present will prevent the inflatable seat belt assembly 46 from inflating.

In addition, the inflatable seat belt restraint system may additionally include a deflation member 84 for opening or rupturing the air bag envelope 30 and allowing the inflation fluid to escape. One form of a deflation member is one or more large apertures in the surface of the envelope which by their size and location control the deflation of the envelope. This form is found in automobile air bags that deploy from the instrument panel. This is successful when the pressures are not too great and the inflator is of sufficient size to generate a large amount of fluid.

Such is not the case in the preferred embodiment, as illustrated in FIG. 22, one form of the deflation member 84 is an electric heating element in contact with the envelope 30. A deflation-igniting device 102 is attached by wires 103 to the heating element and is operable to supply electric power 104 to the deflation member 84. A control system 101 responds to the rapid deceleration signal from the first sensor 92 and the conditions of the sensors indicating the presence of the occupant in the seat and the occupant being buckled up to operate the deflation-igniting device 102. It is understood that the inflator 58 in FIG. 22 can be any form of inflation fluid dispensing system including stored gas.

It has been found that the deflation of the inflated envelope should occur at some predetermined time 82 after detection of a sudden deceleration or crash pulse. This is to ensure that the restraint system produces the minimum rebound to the occupant after the envelope has arrested the occupant's forward velocity. Referring to FIG. 20 there is an illustration of the envelope pressure vs. time graph of the system. In FIG. 21 there is an illustration of the path of travel vs. time of a head 71–73 of a fifth, fiftieth and the ninety-fifth percentile occupant. With each occupant properly buckled up, FIG. 21 illustrates the distance and time that the head travels after receipt of the sudden deceleration signal. The system design goal is such that none of the heads of these individuals, or occupants, reaches the bulkhead 74 in front of the occupant and that rebound is not excessive.

Defining a predetermined time period 82 as shown in FIG. 20 and applying it to FIG. 21, the envelope is deflated at such a time it will reduce or control the rebound of the head 73 of the occupants. Because the different percentile occupants have different weights, the pressure in the envelope differs. If the prior art system of holes was used, the envelope may not achieve sufficient pressure to control the movement of the heavier occupant. A pressure-operated vent is one that opens at a predetermined pressure, but here where the pressures vary with the occupant weight and size, it may not function properly. Still another method of deflating the envelope is to control the porosity of the weaving of the fabric. In this method, the spacing between the several threads is not tight, but is controlled to allow the fluid to escape at a controlled rate from the be inning of inflation.

In order to deflate the envelope properly, a predetermined time 82 delay, generated in a delay device 93 (FIG. 22), responding to the first sensor 92 is employed to actuate the deflation member 84. The heating element operates to weaken the threads of the envelope 30 thereby causing the envelope to open or rupture. As each thread breaks, the adjacent threads must pick up the load carried by the broken thread and they begin to break. This continues until the material has ripped completely or the rip meets with a reinforcement area that operates to halt the travel of the rip.

Another type of deflation member 84 is a pyrotechnic fuse material that is in contact with the envelope 30 and is actuated with similar time of operation utilizing pyrotechnic methods. In one embodiment, the deflation member 84 is an output of a pyrotechnic material.

Instead of operating at predetermined time 82 period after the receipt of the sudden deceleration signal, the time delay can respond to the initiation of the inflator.

Still another embodiment of the inflatable envelope 106 is illustrated in FIG. 23. In this embodiment, instead of the envelope having generally an L shape with rearwardly protruding section 44 of the inflated envelope extending from the upright section 38 of the L, this embodiment has a second downwardly protruding section 108 from the base of the L. This section 108 bears against the thighs 42 of the occupant intermediate the occupant's waist and knees. In addition this section 108 adds additional force to push the thighs 42 and knees down into the seat 34.

Figure 24A:
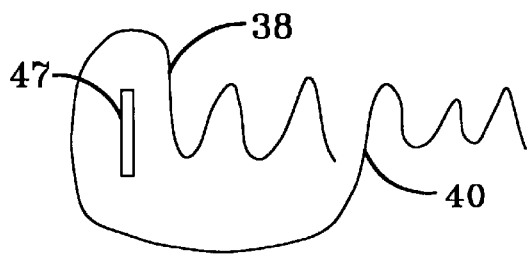
FIGS. 24a–24q are illustrations of the combinations of folding and rolling to store the torso and lap sections of the envelope on the seat belt webbing.
Figure 24B:
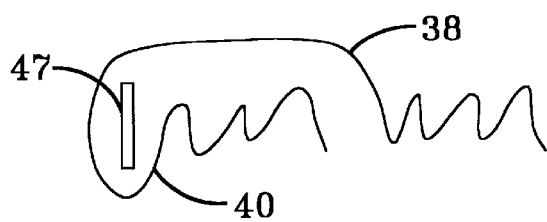
Figure 24C:
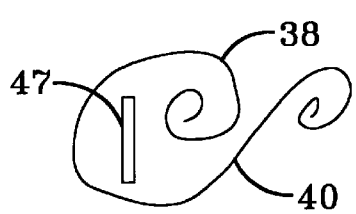
Figure 24D:
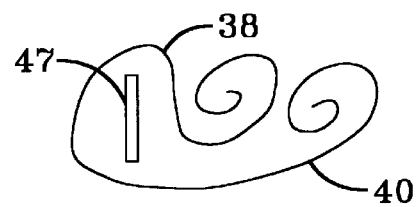
Figure 24E:
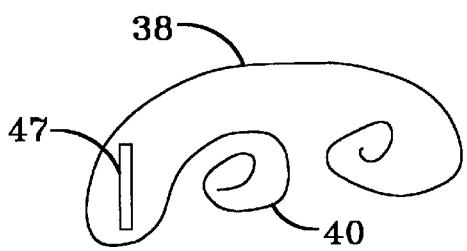
Figure 24F:
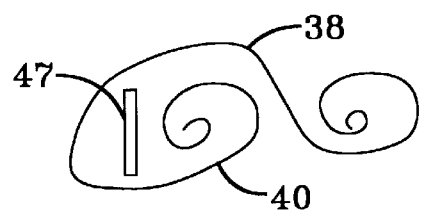
Figure 24G:
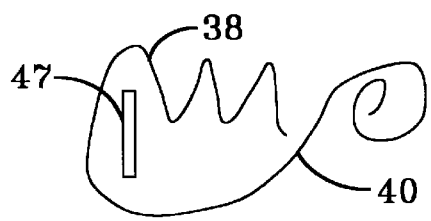
Figure 24H:
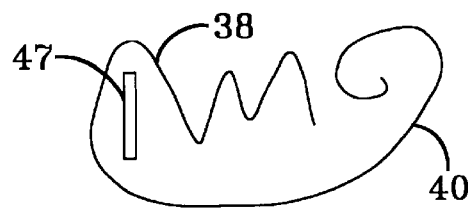
Figure 24I:
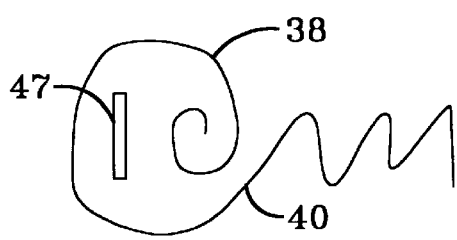
Figure 24J:
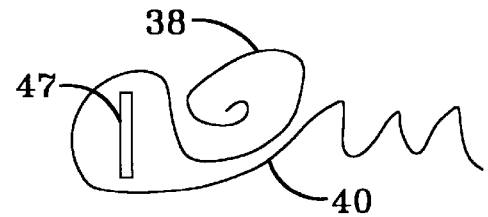
Figure 24K:
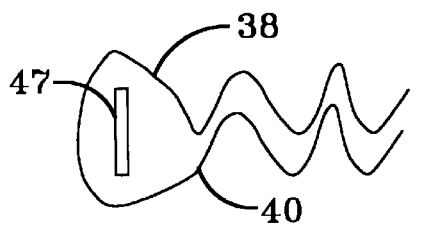
Figure 24L:
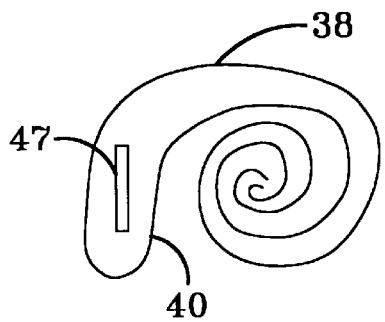
Figure 24M:
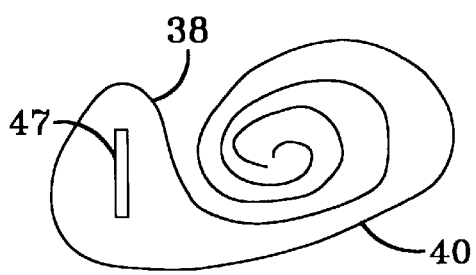
Figure 24N:
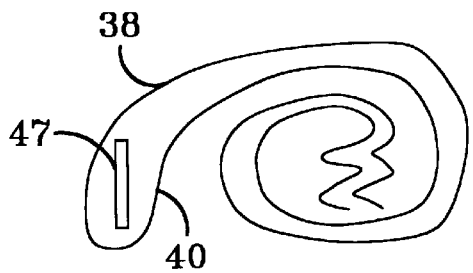
Figure 24O:
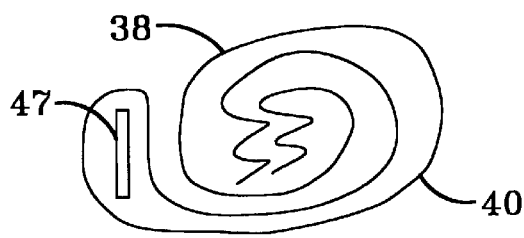
Figure 24P:
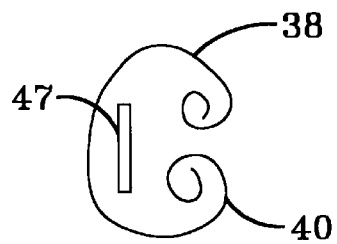
Figure 24Q:
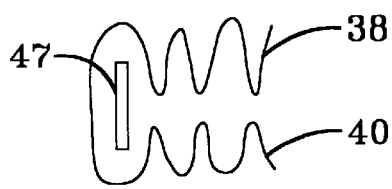

Referring to FIGS. 24a–24q, there are schematically illustrated the various types of folding, rolling and storing of the envelope against the seat belt webbing 47. In all the FIGS. 24a–q illustrated the envelope is first positioned on the back or occupant side of the webbing 47 as hereinbefore described. In FIG. 24a and 24b both the torso section 38 and lap section 40 are accordion folded. In FIG. 24a, the lap section 40 deploys prior to the torso section 38, while in FIG. 24b, the opposite is true, the torso section 38 deploys first.

In FIG. 24c both sections 38, 40 are rolled with the lap section 40 being on top and rolled in a clockwise direction and deploying first in a downward direction. The torso section 38 is rolled in a clockwise direction and deploys last in a downward direction toward the lap of the occupant. In FIG. 24d, the order of deployment is the same as in FIG. 24c but lap section 40 being rolled in a counterclockwise direction deploys in an upward direction while the torso section 38 is rolled in a counterclockwise direction and deploys back on the occupant.

In FIG. 24e, both sections 38, 40 are rolled in a clockwise direction with the torso section 38 deploying first and downward while the lap section 40 deploying second and downward. In FIG. 24f, both sections are rolled in a counterclockwise direction with the torso section 38 deploying first and upward with the lap section 40 deploying second and downward.

In FIG. 24g, the torso section 38 is accordion folded with the lap section 40 being rolled in clockwise direction to deploy first and in a downward direction. In FIG. 24h, the torso section 38 is accordion folded and the lap section 40 is rolled in a counterclockwise direction to deploy first and in an upward direction.

In FIGS. 24i and 24j the lap sections 40 are accordion folded and are on top so that they deploy first. In FIG. 24i, the torso section 38 is rolled in a clockwise direction and in FIG. 24j the torso section 38 is rolled in a counterclockwise direction and deploys after the lap section 40.

In FIG. 24k both the torso section 38 and lap section 40 are accordion folded but are interleaved one with the other. In this example, both sections 38, 40 tend to deploy at the same time because the inflation fluid flows from the back of the webbing through each section. As the outer folds tend to deploy, they push against each other and enhance the deployment by reducing the resistance to the flow of the inflation fluid.

In FIG. 24l, both sections 38, 40 are rolled together in a clockwise direction and again both sections will deploy at substantially the same time and in a downward direction. In FIG. 24m, both sections 38, 40 are rolled together in a counterclockwise direction and again both sections will deploy at substantially the same time but in an upward direction.

In FIGS. 24n and 24o both sections 38, 40 are brought together and intertwined in accordion pleats at the outside portion of the sections and then the sections are rolled together. In FIG. 24n the rolling is in a clockwise direction and in FIG. 24O the rolling is in a counterclockwise direction.

In FIG. 24p there is illustrated the bumper roll wherein both the torso section 38 and the lap section 40 are rolled and placed side-by-side on the belt webbing 47. As illustrated, the torso section 38 is rolled in a clockwise direction and the lap section 40 is rolled in a counterclockwise direction. It is obvious that sections can be rolled in either direction, clockwise or counterclockwise, but the importance of this FIG. 24*p* is the placing of the rolls side-by-side in front of the belt webbing 47.

In FIG. 24*q* there is illustrated the bumper fold wherein both the torso section 38 and the lap section 40 are folded in accordion pleats and placed side-by-side on the belt webbing 47. The importance of this FIG. 24*q* is the placing of the folded sections side-by-side in front of the belt webbing 47.

In each of the FIGS. 24*a*–24*j*, the direction of rolling of the sections determines the direction that section will deploy and the position of the sections relative to the seat belt webbing determines the order of deployment. In each of the FIGS. 24*k*–24*q*, deployment is substantially at the same time while the direction of rolling indicates the direction the sections will deploy, either upward or downward.

In summary, the inflatable air bag as used in the inflatable restraint system herein described and hereinafter claimed has at least the following characteristics.

1. The action of inflation of the inflatable air bag 30, 106 around the occupant operates to tension the seat belt webbing 47 around the occupant. This seat belt tensioning is automatically related to the pressure in the envelope 30 during the crash in addition to occupant induced loads.

2. The action of inflation of the inflatable air bag 30, 106 around the occupant operates to pre-load the occupant back and down into the seat 34.

3. The positioning and structure of the inflatable air bag 30, 106 around the occupant reduces both the lower and upper body translation of the occupant.

4. The inflatable air bag 30, 106 provides upper body motion control via a fluid filled envelope 30 that resists compression as the upper body torso of the occupant rotates about the seat belt webbing 47 toward the upper thighs 42 of the occupant.

5. The inflatable air bag 30, 106, by controlling the upper body motion, lowers the peak deceleration of the chest and the upper body of the occupant.

6. The structure of the inflatable air bag 30, 106 provides no face contact by adults with the inflated envelope 30 thereby reducing and even eliminating facial abrasions.

There has thus been shown and described an inflatable air bag 30, 106 for restraining an occupant in a seat 34 during a sudden deceleration of a vehicle. The vehicle can be an automobile, an airplane, a boat or any other vehicle that is capable of coming to a sudden stop causing the occupants to move forward relative to the vehicle. The inflatable air bag is fabricated from a low denier material and has a very defined shape including a rearward protruding section 44 from one end. Another embodiment 106 has an additional downward protruding section 108 from the other end of the inflatable envelope. Rearward and downward are directions relative to the inflation of the envelope when the air bag is in position on a seated occupant during normal operation of the vehicle.

There has also been described and shown, a system for controlling the actuation of the inflatable for filling the envelope with an inflatable fluid. By proper folding of the inflatable envelope 30 and proper securing it to a seat belt webbing 47, the order of the inflation of the various sections of the inflatable envelope has been shown and described.

Once the inflatable is inflated, a deflation or venting member 84 is used to open the envelope 30 to release the inflation fluid. The venting member 84 can be a series of properly sized apertures or a deflation member 84 or the controlled porosity of the fabric of the envelope.

Accordingly, various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An inflatable air bag for restraining an occupant in a seat during a sudden deceleration of a vehicle, the air bag comprising:

an inflatable envelope of a fabric material;

a fluid-receiving inlet attached to said envelope to receive inflation fluid for inflating said envelope, wherein said inflatable envelope has generally an L shape when inflated, and wherein the L shape comprises:

a torso section for protecting the body of the occupant between the waist and the neck;

a lap section for protecting the body of the occupant between the waist and the knees; and a rearwardly protruding section extending from the torso section for protecting the body of the occupant below the neck; and a seat belt connected to one surface of said envelope between the torso and the lap sections forming a waist section allowing fluid communication between said torso and lap sections.

2. The air bag according to claim 1 wherein said envelope is connected to said seat belt by at least one row of stitching.

3. The air bag according to claim 1 wherein the fabric material has a denier greater than 110 and less than 630.

4. The air bag according to claim 3 wherein the fabric material has a denier less than 210.

5. The air bag according to claim 1 wherein said seat belt is adapted to be put into tension by the inflation of said waist section of said envelope behind said seat belt.

6. The air bag according to claim 1 wherein said fluid-receiving inlet attached to said envelope is a tubular member fixedly attached to the envelope, said tubular member having at least one intussusceptive fold allowing said tubular member to elongate as said envelope inflates.

7. The air bag according to claim 6 wherein said intussusceptive fold is within said envelope.

8. The air bag according to claim 6, wherein said intussusceptive fold is positioned between two ends of said seat belt and upstream of said envelope.

9. The air bag according to claim 1 wherein said fluid-receiving inlet attached to said envelope is a tubular member fixedly attached to the envelope and said tubular member having a bellows formation intermediate its length allowing said tubular member to elongate as said envelope inflates.

10. The air bag according to claim 9 wherein said bellows formation is within said envelope.

11. The air bag according to claim 9 wherein said bellows formation is intermediate the ends of said seat belt and upstream of said envelope.

12. The air bag according to claim 1 wherein said fluid-receiving inlet has bifurcated outlet extensions wherein the bifurcated outlet extensions are attached to the envelope on either side of said seat belt.

13. The air bag according to claim 1 wherein said envelope is folded on said seat belt so as to extend from one broadside of said seat belt and lie on the other broadside of said seat belt.

14. The air bag according to claim 13 additionally including a frangible tubular cover enclosing said folded envelope around said seat belt.

15. The air bag according to claim 14 wherein said frangible tubular cover has at least one weakened section allowing said cover to rupture under pressure.

16. The air bag according to claim 15 wherein said weakened section is at least one laser cut extending over said folded envelope.

17. The air bag according to claim 16 wherein said at least one laser cut is on the inside of the frangible tubular cover and extending over said folded envelope.

18. The air bag according to claim 13 wherein said envelope is folded to cause said lap section to be inflated prior to said torso section.

19. The air bag according to claim 18 wherein said torso section is rolled and stored against said seat belt, and wherein said lap section has accordian-style pleats and is stored against said torso section so that said lap section inflates before said torso section.

20. The air bag according to claim 13 wherein said envelope is folded to cause said torso section to be inflated prior to said lap section.

21. The air bag according to claim 13 wherein said envelope is folded to cause said lap section and said torso section to be inflated simultaneously.

22. The air bag according to claim 13 wherein either or both of said lap section and torso section is folded with a series of accordion-shaped pleats.

23. The air bag according to claim 13 wherein said lap and torso sections are interleaved in accordion-shaped pleats.

24. The air bag according to claim 13 wherein either or both of said lap section and said torso section is rolled in a roll-shaped configuration.

25. The air bag according to claim 13 wherein said lap section and said torso section are rolled in a bumper roll-shaped configuration.

26. The air bag according to claim 1 wherein said envelope is a seamless woven member.

27. The air bag according to claim 1 wherein said envelope is a unitary sheet member folded together and having matching edges joined together forming an envelope.

28. The air bag according to claim 1 further comprising:
a deflation member for allowing the inflation fluid to escape from said envelope, wherein said deflation member is connected to a control system.

29. The air bag according to claim 28 wherein said deflation member is a heated element in contact with said envelope.

30. The air bag according to claim 28 wherein said deflation member is a pyrotechnic fuse.

31. The air bag according to claim 28 wherein said deflation member is an output of a pyrotechnic material.

32. A method of manufacturing an inflatable seat belt assembly for restraining an occupant in a vehicle during a sudden deceleration of the vehicle, the method comprising the steps of:
cutting a unitary flat pattern from a fabric material;
folding the unitary flat pattern to create a folded pocket with a perimeter;
securing the folded pocket along the perimeter to create an envelope with two ends, wherein the envelope has an aperture between the two ends;
attaching in a leak-tight manner, a fluid-receiving inlet to the aperture;
connecting a first broadside surface of the envelope to a rear side of a seat belt between the two ends of the envelope with stitches, wherein the seat belt divides the envelope into a torso section, a waist section and a lap section, and wherein the stitches extend through the first broadside, surface and through the seat belt;
folding at least one of the lap or torso sections on the stitches and overlapping the other lap or torso section so that the two sections overlie the front side of the seat belt and form a folded envelope; and
enclosing the folded envelope, the fluid-receiving inlet and the seat belt with a frangible tubing.

33. The method according to claim 32 wherein the aperture is cut into a second broadside surface of the envelope.

34. The method according to claim 33 wherein a second aperture is cut into the second broadside surface of the envelope.

35. The method according to claim 32 wherein prior to the step of enclosing, insert the step of weakening a section on the frangible tubing overlaying a portion of the folded envelope.

36. The method according to claim 35 wherein the step of weakening a section on the frangible tubing is by laser cutting.

37. The method according to claim 35 herein the step of weakening a section on the frangible tubing is by forming the tubing by stitching at least two longitudinal edges of a flat material together to form a tube and wherein at least a portion of said stitching is weaker than the material.

38. The method according to claim 32 additionally including the step of folding an intussusception in the fluid-receiving inlet at least once along its length.

39. The method according to claim 38 wherein said intussusception is within the envelope.

40. The method according to claim 32 additionally including the step of folding a bellows formation along a portion of the length of the fluid-receiving inlet.

41. The method according to claim 40 wherein the bellows formation is between the inlet and one end of the seat belt.

42. The method according to claim 40 wherein the bellows formation is within the envelope.

43. An inflatable seat belt restraint system for restraining an occupant in a seat of a vehicle during the time period that the vehicle is undergoing a sudden deceleration, the inflatable restraint system comprising:
a seat secured to the vehicle, said seat for normally supporting an occupant, the occupant having a torso body portion, a neck portion, a lap portion including a thigh portion, a waist portion intermediate said body portion and said lap portion and a knee portion;
a seat belt assembly having an elongated webbing secured to the seat at two ends, wherein said webbing has a tongue and buckle at a first end, and wherein said seat belt assembly extends across the occupant for holding the occupant in said seat;
a first sensor responding to the sudden deceleration of the vehicle by generating a first signal;
an envelope folded about said webbing, wherein a portion of said envelope extends on both sides of said webbing, said envelope having a waist section, a torso section and a lap section;
a frangible tubular cover enclosing said envelope and said webbing;
a fluid-receiving tubular inlet member attached to said envelope to receive inflation fluid for inflating said envelope;
an inflator in communication with said fluid-receiving tubular inlet member and said first sensor, wherein, upon generation of said first signal, said inflator supplies inflation fluid to said envelope, and wherein said inflation fluid inflates said waist section of said envelope between said webbing the occupant for tightening said webbing;

wherein said envelope has generally an L shape when inflated, and wherein the L shape comprises said torso section for protecting the body of the occupant between the waist and the neck, said lap section for protecting the body of the occupant between the waist and the knees, and a rearwardly protruding section extending from the torso section for protecting the body of the occupant below the neck, and wherein said torso section, said waist section, said rearwardly protruding section and said lap section of said envelope applies a pressure against said body of the occupant during the sudden deceleration of the vehicle.

44. The inflatable seat belt restraint system according to claim 43 wherein said envelope is attached to said webbing by at least one row of stitching.

45. The inflatable seat belt restraint system according to claim 43 wherein said envelope is formed of a material having a denier greater than 100 and less than 630.

46. The inflatable seat belt restraint system according to claim 45 wherein said envelope is formed of a material having a denier less than 210.

47. The inflatable seat belt restraint system according to claim 43 wherein said fluid-receiving tubular inlet member has bifurcated outlet extensions fixedly attached to said envelope with at least one intussusceptive fold allowing said fluid-receiving tubular inlet member to elongate as said envelope inflates.

48. The inflatable seat belt restraint system according to claim 43 wherein said fluid-receiving tubular inlet member has one end fixedly attached to said envelope and at least one intussusceptive fold allowing said fluid-receiving tubular inlet member to elongate as said envelope inflates.

49. The inflatable seat belt restraint system according to claim 48 wherein said intussusceptive fold is within said envelope.

50. The inflatable seat belt restraint system according to claim 48 wherein said intussusceptive fold is intermediate said envelope and said inflator.

51. The inflatable seat belt restraint system according to claim 43 wherein said fluid-receiving tubular inlet member has one end fixedly attached to said envelope and a bellows formation allowing said fluid-receiving tubular inlet member to elongate as said envelope inflates.

52. The inflatable seat belt restraint system according to claim 51 wherein said bellows formation is within said envelope.

53. The inflatable seat belt restraint system according to claim 51 wherein said bellows formation is located between the two ends of said seat belt assembly and upstream of said envelope.

54. The inflatable seat belt restraint system according to claim 43 wherein said fluid-receiving tubular inlet member has bifurcated outlet extensions fixedly attached to said envelope and a bellows formation allowing said fluid-receiving tubular inlet member to elongate as said envelope inflates.

55. The inflatable seat belt restraint system according to claim 43 wherein said seat belt assembly additionally has an anchor member at a second end of said webbing, and wherein said buckle is attached to said seat.

56. The inflatable seat belt restraint system according to claim 43 further comprising a control system, wherein the first sensor and a second sensor are connected to said control system ,and wherein the second sensor generates a second signal to indicate the presence of an occupant in said seat.

57. The inflatable seat belt restraint system according to claim 56 further comprising a third sensor connected to the control system to indicate with a third signal whether said seat belt assembly is joined together at said tongue and buckle.

58. The inflatable seat belt restraint system according to claim 57, wherein said control system receives said first, second and third signals and supplies inflation fluid to said envelope.

59. The inflatable seat belt restraint system according to claim 56, further comprising a deflation member connected to said control system for opening said envelope to allow at least a portion of the inflation fluid to escape.

60. The inflatable seat belt restraint system according to claim 59 wherein said deflation member is a heating element in contact with said envelope, and wherein a deflation igniting device is in fluid communication with said heating element and said control system and capable of actuating said heating element.

61. The inflatable seat belt restraint system according to claim 60 wherein said control system includes a time delay for generating said igniting device within a predetermined time period after operation of the inflator.

62. The inflatable seat belt restraint system according to claim 59 wherein said deflation member is a pyrotechnic fuse member in contact with said envelope, wherein a deflation igniting device is attached to said pyrotechnic fuse member and capable of actuating said pyrotechnic fuse member.

63. The inflatable seat belt restraint system according to claim 62 wherein said control system includes a time delay for generating said igniting device within a predetermined time period after operation of the inflator.

64. The inflatable seat belt restraint system according to claim 43 wherein said envelope is folded so that said lap section is inflated prior to said torso section.

65. The inflatable seat belt restraint system according to claim 43 wherein said lap section is folded with a series of accordion-shaped pleats.

66. The inflatable seat belt restraint system according to claim 65 wherein said torso section is folded in a roll-shaped configuration.

67. The inflatable seat belt restraint system according to claim 66 wherein said torso section is stored against said webbing and said lap section is stored against said torso section whereby said inflation fluid causes said lap section to inflate prior to said torso section.

68. The inflatable seat belt restraint system according to claim 43 wherein said envelope is a seamless woven member.

69. The inflatable seat belt restraint system according to claim 43 wherein said envelope is a unitary sheet member folded together and having matching edges joined together.

70. In an inflatable envelope, a vent for releasing gas from the inflatable envelope, the vent comprising:

a deflation member connected to one surface of the inflatable envelope;

a pair of wires electrically connecting said deflation member and an igniting device for actuating said deflation member;

a control system comprising at least one sensor capable of generating a signal, and wherein upon receiving said signal said control system actuates said igniting device, thereby releasing the gas.

71. The vent according to claim 70, further comprising a delay device connected to said control system for inserting a time delay in the actuation of said igniting device.

72. The vent according to claim 70 wherein said deflation member is a pyrotechnic fuse.

73. A vent for deflating an inflatable envelope, wherein the envelope is formed of a fabric material and mounted on a seat belt, and wherein a fluid-receiving inlet is in fluid communication with the envelope to receive inflation fluid, the vent comprising:
- a sensor that generates a signal upon sudden deceleration of a vehicle;
- a deflation device connected to one surface of the inflatable envelope;
- an igniting device in communication with the deflation device; and
- a control system in communication with said sensor and said igniting device, wherein upon receiving said signal, the control system actuates said igniting device thereby allowing the inflation fluid to leave the envelope.

74. A vent according to claim 73, further comprising a delay connected to said control system for inserting a time delay in the actuation of said deflation device.

75. A vent according to claim 73 wherein said deflation device is a pyrotechnic fuse, and wherein said control system further comprises a time delay.

76. A vent according to claim 73 wherein said deflation device is located adjacent to said fluid-receiving inlet.

* * * * *